United States Patent
Ozawa et al.

(10) Patent No.: US 10,051,245 B2
(45) Date of Patent: Aug. 14, 2018

(54) DISPLAY SYSTEM AND DISPLAY APPARATUS

(71) Applicant: Japan Display Inc., Tokyo (JP)

(72) Inventors: Yutaka Ozawa, Tokyo (JP); Akira Sakaigawa, Tokyo (JP); Keiji Fukuhara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/613,888

(22) Filed: Jun. 5, 2017

(65) Prior Publication Data

US 2017/0272702 A1   Sep. 21, 2017

Related U.S. Application Data

(63) Continuation of application No. PCT/JP2015/083822, filed on Dec. 1, 2015.

(30) Foreign Application Priority Data

Dec. 8, 2014  (JP) ................................ 2014-248201

(51) Int. Cl.
*H04N 1/04*       (2006.01)
*H04N 7/18*       (2006.01)
(Continued)

(52) U.S. Cl.
CPC ............ *H04N 7/181* (2013.01); *B60R 1/025* (2013.01); *G09G 5/005* (2013.01);
(Continued)

(58) Field of Classification Search
CPC ............ G06K 9/00711; G06K 9/6201; G06K 9/6212; G06K 9/6215; G06K 9/00281;
(Continued)

(56) References Cited

U.S. PATENT DOCUMENTS 4,636,624 A * 1/1987 Ishida ..................... G02B 7/34
                                                   250/201.8
5,202,555 A * 4/1993 Ishida ..................... G02B 7/34
                                                   250/201.8
(Continued)

FOREIGN PATENT DOCUMENTS

JP   H10-84499 A   3/1998
JP   2001-078211 A   3/2001
(Continued)

OTHER PUBLICATIONS

International Search Report (with English translation) dated Feb. 23, 2016 in corresponding international application No. PCT/JP2015/083822 (5 pages).
(Continued)

*Primary Examiner* — Negussie Worku
(74) *Attorney, Agent, or Firm* — K&L Gates LLP

(57) ABSTRACT

The display system includes a display system including an image-capturing apparatus including an image-capturing element; an image processing apparatus that performs image processing on the image; and a display apparatus including a display device that displays the image resulting from the image processing. The image processing apparatus includes an image processor that performs the image processing on a predetermined number of line images corresponding to a part of a frame image captured by the image-capturing element, sequentially outputs the image to the display apparatus per the predetermined number of line images, and causes the display apparatus to display the frame image; and a storage device that stores the predetermined number of line images until the frame image is completed. The image processor is configured to perform the image processing including frame unit processing on the predetermined num-
(Continued)

ber of line images associated with the frame image to be output.

19 Claims, 15 Drawing Sheets

(51) Int. Cl.
*G09G 5/00* (2006.01)
*H04N 7/24* (2011.01)
*B60R 1/02* (2006.01)
*H04N 5/42* (2006.01)
*H04L 12/18* (2006.01)
*H04N 5/77* (2006.01)
*B60R 1/12* (2006.01)

(52) U.S. Cl.
CPC ........... *H04L 12/1895* (2013.01); *H04N 5/42* (2013.01); *H04N 5/772* (2013.01); *H04N 7/24* (2013.01); *B60R 2001/1253* (2013.01); *G09G 2370/12* (2013.01)

(58) Field of Classification Search
CPC .... G06K 9/52; H04N 13/0239; H04N 13/044; H04N 13/0468; H04N 13/0014; H04N 13/0285; H04N 13/0438; H04N 13/0456; H04N 13/0459
USPC ........ 382/128, 133, 274; 358/474, 475, 509, 358/448, 488
See application file for complete search history.

(56) References Cited

U.S. PATENT DOCUMENTS

| | | | |
|---|---|---|---|
| 5,801,813 A * | 9/1998 | Morimoto | G03B 27/52 355/27 |
| 5,970,180 A | 10/1999 | Niihara et al. | |
| 7,170,632 B1 * | 1/2007 | Kinjo | G03B 17/24 348/231.3 |
| 8,639,029 B2 * | 1/2014 | Kasahara | H04N 19/63 358/518 |
| 8,834,359 B2 * | 9/2014 | Ozawa | A61B 1/0638 356/237.1 |
| 9,077,944 B2 * | 7/2015 | Ajito | H04N 9/735 |
| 9,330,299 B2 * | 5/2016 | Makihira | G06K 9/00281 |
| 2005/0169523 A1 * | 8/2005 | Hayaishi | H04N 1/6052 382/167 |
| 2006/0098898 A1 | 5/2006 | Muraki | |
| 2006/0238828 A1 * | 10/2006 | Kanno | H04N 5/23248 358/474 |
| 2006/0291692 A1 * | 12/2006 | Nakao | G06K 9/6807 382/101 |
| 2007/0216876 A1 * | 9/2007 | Narikawa | H04N 9/3114 353/84 |
| 2009/0189994 A1 * | 7/2009 | Shimonaka | H04N 5/2251 348/222.1 |
| 2010/0033627 A1 | 2/2010 | Hayashi et al. | |
| 2012/0265041 A1 * | 10/2012 | Yamaguchi | A61B 1/00004 600/328 |
| 2013/0038795 A1 | 2/2013 | Hayashi et al. | |
| 2013/0258048 A1 * | 10/2013 | Wang | H04N 1/387 348/38 |
| 2014/0176800 A1 | 6/2014 | Hayashi et al. | |
| 2014/0369662 A1 | 12/2014 | Hayashi et al. | |
| 2015/0099932 A1 * | 4/2015 | Morimoto | A61B 1/00057 600/180 |
| 2015/0201145 A1 | 7/2015 | Hayashi et al. | |
| 2016/0234459 A1 | 8/2016 | Hayashi et al. | |

FOREIGN PATENT DOCUMENTS

| | | |
|---|---|---|
| JP | 2004-118047 A | 4/2004 |
| JP | 2006-135565 A | 5/2006 |
| JP | 2008-034913 A | 2/2008 |
| JP | 2011-044873 A | 3/2011 |
| WO | 2008/111257 A1 | 9/2008 |
| WO | 2009/098763 A1 | 8/2009 |

OTHER PUBLICATIONS

Written Opinion dated Feb. 23, 2016 in corresponding international application No. PCT/JP2015/083822 (4 pages).

* cited by examiner

FIG.11

RELATED ART

| CONVENTIONAL TECHNIQUE | | | |
|---|---|---|---|
| | IMAGE-CAPTURING | IMAGE PROCESSING | DISPLAY |
| ENCODING/ DECODING OF IMAGE | ENCODING | DECODING/ ENCODING | DECODING |
| GAMMA CONVERSION/ INVERSE GAMMA CONVERSION | GAMMA CONVERSION | GAMMA CONVERSION/ INVERSE GAMMA CONVERSION | INVERSE GAMMA CONVERSION IN CASES OTHER THAN CRT |

FIG.12

| FIRST EMBODIMENT | | | |
|---|---|---|---|
| | IMAGE-CAPTURING | IMAGE PROCESSING | DISPLAY |
| ENCODING/ DECODING OF IMAGE | NONE | NONE | NONE |
| GAMMA CONVERSION/ INVERSE GAMMA CONVERSION | NONE | NONE | NONE |

DISPLAY SYSTEM AND DISPLAY APPARATUS

CROSS-REFERENCE TO RELATED APPLICATIONS

This application is a continuation of PCT international application Ser. No. PCT/JP2015/083822 filed on Dec. 1, 2015, which designates the United States, the entire contents of which are incorporated herein by reference, and which claims the benefit of priority from Japanese Patent Application No. 2014-248201, filed on Dec. 8, 2014, incorporated herein by reference.

BACKGROUND

1. Technical Field

The present invention relates to a display system and a display apparatus.

2. Description of the Related Art

It is well known that there are systems that transmit an image captured by an image-capturing apparatus, such as a digital camera, to a display apparatus to display the image thereon, including a system disclosed in PCT Publication No. WO 2008/111257, for example.

Before transmitting image data captured by an image-capturing apparatus to a display apparatus, the conventional systems perform encoding to convert the image data into image data in a format limited to the sRGB color space. As a result, the conventional systems require a processing time for the encoding and decoding performed by the display apparatus, for example. The processing time increases delay (frame delay) caused until the captured image is displayed. The conventional systems output data resulting from encoding per frame image. As a result, the conventional systems inevitably cause frame delay of at least one frame when the data is output from the image-capturing apparatus. In a case where the display apparatus performs image processing, the display apparatus requires a processing time for inverse gamma conversion performed before the image processing and gamma conversion performed after the image processing besides the processing time for decoding. As a result, the frame delay further increases. The conventional systems limit the color space of the image output from the image-capturing apparatus to the sRGB color space. As a result, the conventional systems fail to exploit the potential in color recognition of an image-capturing element of the image-capturing apparatus.

For the foregoing reasons, there is a need for a display system and a display apparatus that can reduce frame delay. Alternatively, there is a need for a display system and a display apparatus that can exploit the potential in color recognition of an image-capturing element of an image-capturing apparatus.

SUMMARY

According to an aspect, a display system includes: an image-capturing apparatus including an image-capturing element that captures an image; an image processing apparatus that performs image processing on the image; and a display apparatus including a display device that displays the image resulting from the image processing. The image processing apparatus includes: an image processor that performs the image processing on a predetermined number of line images corresponding to a part of a frame image captured by the image-capturing element, sequentially outputs the image to the display apparatus per the predetermined number of line images, and causes the display apparatus to display the frame image; and a storage device that stores therein the predetermined number of line images until the frame image is completed. The image processor is configured to perform the image processing including frame unit processing on the predetermined number of line images associated with the frame image to be output to the display apparatus.

According to another aspect, a display apparatus includes: an image processor that performs image processing on a predetermined number of line images corresponding to a part of a frame image captured by an image-capturing element, sequentially outputs an image to a display device per the predetermined number of line images, and causes the display device to display the frame image; and a storage device that stores therein the predetermined number of line images until the frame image is completed. The image processor is configured to perform the image processing including frame unit processing on the predetermined number of line images associated with the frame image to be output to the display device.

According to another aspect, a display system includes: an image-capturing apparatus including an image-capturing element that captures an image; an image processing apparatus that performs image processing on the image; and a display apparatus including a display device that displays the image resulting from the image processing. The image-capturing apparatus, the display apparatus, and the processing apparatus are configured to operate in association with a vehicle. The image processing apparatus is arranged near one of the image-capturing apparatus and the display apparatus. The image processing apparatus includes an image processor that performs the image processing on a predetermined number of line images corresponding to a part of a frame image captured by the image-capturing element, sequentially outputs the image to the display apparatus per the predetermined number of line images, and causes the display apparatus to display the frame image.

BRIEF DESCRIPTION OF THE DRAWINGS

FIG. 11 is a diagram schematically illustrating a conventional mechanism of data transfer including encoding and decoding;

FIG. 12 is a diagram schematically illustrating a mechanism of data transfer in the display system according to the first embodiment;

DETAILED DESCRIPTION

Figure 1:
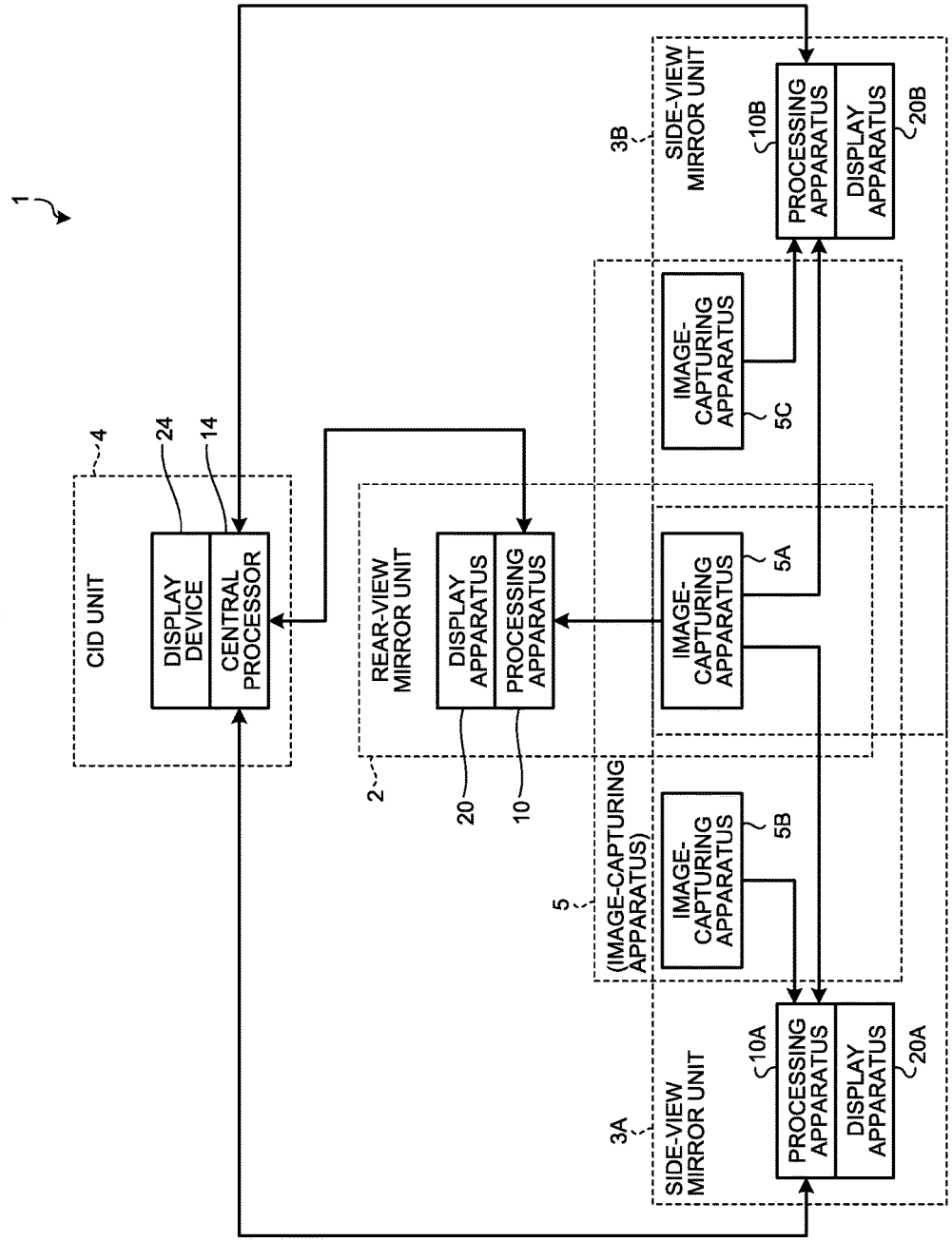
FIG. 1 is a diagram of a main configuration of a display system according to a first embodiment of the present invention.

Exemplary embodiments according to the present invention are described below with reference to the accompanying drawings. The disclosure is given by way of example only, and various modifications made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to preceding figures are denoted by the same reference numerals, and overlapping explanation thereof may be appropriately omitted.

In this disclosure, when an element is described as being "on" another element, the element can be directly on the other element, or there can be one or more elements between the element and the other element.

First Embodiment

FIG. 1 is a diagram of a main configuration of a display system 1 according to a first embodiment of the present invention. As illustrated in FIG. 1, the display system 1 includes a rear-view mirror unit 2, two side-view mirror units 3A and 3B, and a center information display (CID) unit 4. The display system 1 is an on-board display system and provided in a vehicle such as a car.

The rear-view mirror unit 2 and the side-view mirror units 3A and 3B each include an image-capturing apparatus 5, a processing apparatus 10 (or processing apparatuses 10A and 10B), and a display apparatus 20 (or display apparatuses 20A and 20B), for example. The image-capturing apparatus 5 includes an image-capturing element 72 (refer to FIG. 8) that captures an image. The processing apparatuses 10, 10A and 10B each perform image processing on an image. The display apparatuses 20, 20A and 20B may include one or more of a liquid crystal display (LCD), a light emitting diode display (LED), an organic light emitting diode display (OLED) and a reflective display, and each display an image subjected to the image processing. The rear-view mirror unit 2 and the side-view mirror units 3A and 3B can each function as one unit of processing (display system). In other words, the processing apparatuses 10, 10A, and 10B of the rear-view mirror unit 2 and the side-view mirror units 3A and 3B perform image processing on an image displayed by the display apparatuses 20, 20A, and 20B, respectively.

Figure 2:
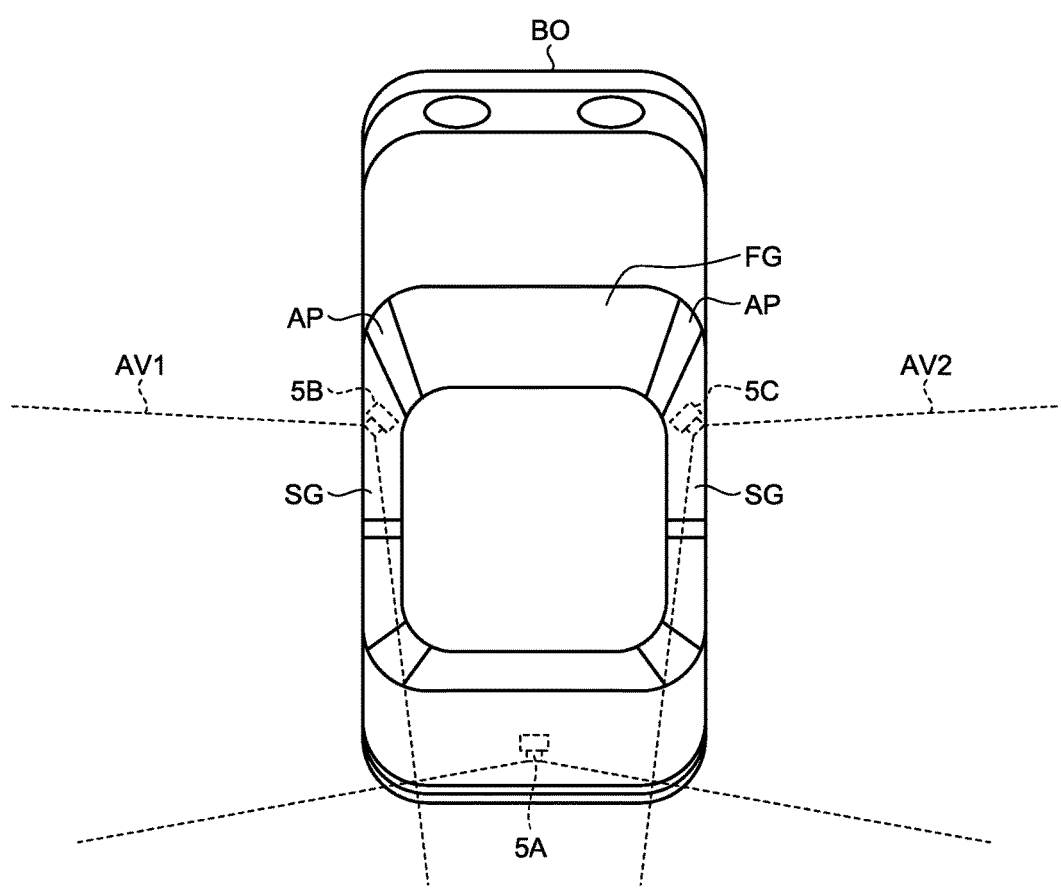
FIG. 2 is a schematic diagram of exemplary arrangement of image-capturing apparatuses of a rear-view mirror unit and side-view mirror units.

FIG. 2 is a schematic diagram of exemplary arrangement of image-capturing apparatuses 5A, 5B, and 5C of the rear-view mirror unit 2 and the side-view mirror units 3A and 3B. In FIG. 2, angles of view of the image-capturing apparatuses 5A, 5B, and 5C are indicated by the dashed lines. The rear-view mirror unit 2 and the side-view mirror units 3A and 3B according to the first embodiment share the image-capturing apparatus 5. Specifically, as illustrated in FIG. 2, for example, the display system 1 according to the first embodiment includes three image-capturing apparatuses 5A, 5B, and 5C. The three image-capturing apparatuses 5A, 5B, and 5C are arranged on the rear side and both sides, respectively, of a body BO of a vehicle such as a car. Each of the image-capturing apparatuses 5A, 5B, and 5C includes an image-capturing element 72 that is exposed outward through a lens 71 (refer to FIG. 8), and the angle of view of which extends toward the outside of the car. In other words, the three image-capturing apparatuses 5A, 5B, and 5C capture images with which the states outside the car can be checked. More specifically, the angles of view of the image-capturing apparatuses 5B and 5C provided on both sides of the car and the angle of view of the image-capturing apparatus 5A provided on the rear side of the car partially overlap with each other. With this arrangement, the image-capturing areas of the three image-capturing apparatuses 5A, 5B, and 5C can cover the views behind angles of view AV1 and AV2 on the front side of the car out of the angles of view of the side image-capturing apparatuses 5B and 5C. The rear-view mirror unit 2 according to the first embodiment, for example, displays an image captured by the rear image-capturing apparatus 5A. The side-view mirror unit 3A displays an image obtained by synthesizing an image captured by the rear image-capturing apparatus 5A and an image captured by the side image-capturing apparatus 5B. The side-view mirror unit 3B displays an image obtained by synthesizing an image captured by the rear image-capturing apparatus 5A and an image captured by the side image-capturing apparatus 5C. This configuration is given by way of example only, and the present invention is not limited thereto. The rear-view mirror unit 2, for example, may display an image obtained by synthesizing images received from the three image-capturing apparatuses 5A, 5B, and 5C. The image-capturing apparatuses 5A, 5B, and 5C are hereinafter referred to as the image-capturing apparatus 5 when they need not particularly be distinguished from one another.

Figure 3:
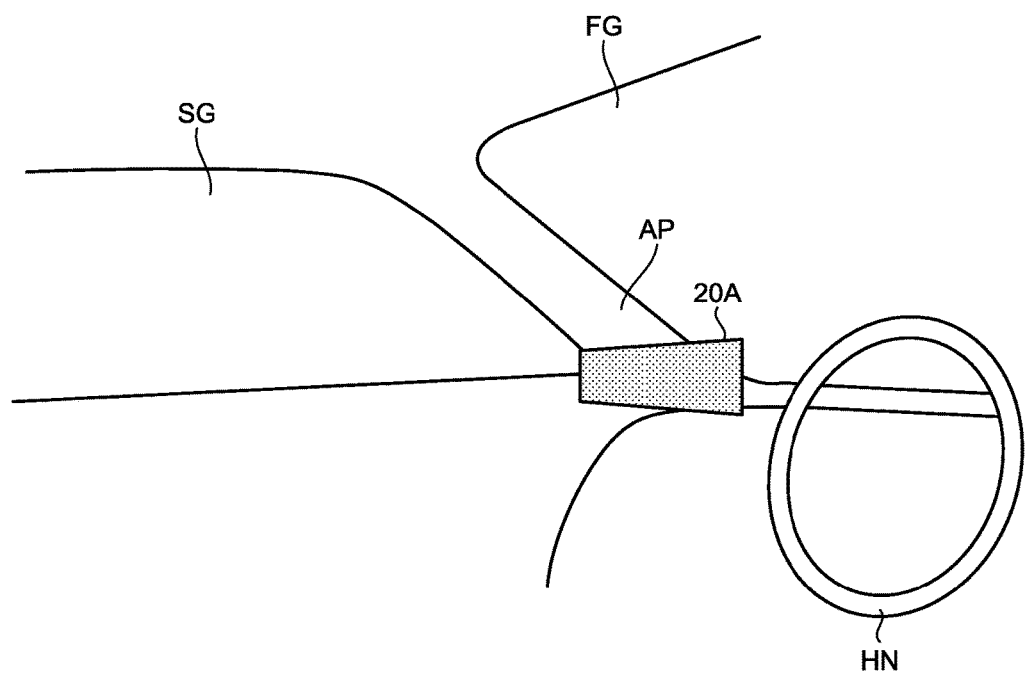
FIG. 3 is a schematic diagram of exemplary arrangement of a display apparatus of the side-view mirror unit.

FIG. 3 is a schematic diagram of exemplary arrangement of the display apparatus 20A of the side-view mirror unit 3A. The display apparatus 20A of the side-view mirror unit 3A is arranged on a side of a driver's seat in a four-wheeled car. Specifically, as illustrated in FIG. 3, for example, the display apparatus 20A of the side-view mirror unit 3A is provided near the root end of an A pillar AP between a windshield FG and a side glass SG. The display apparatus 20B of the side-view mirror unit 3B is provided at a position on the opposite side of the display apparatus 20A of the side-view mirror unit 3A in the horizontal direction with respect to the driver's seat provided with a steering wheel HN and the like. Each of the display apparatus 20A of the side-view mirror unit 3A and the display apparatus 20B of the side-view mirror unit 3B mainly displays an image indicating the view of a side of the body BO out of the views outside the car. In other words, the side-view mirror units 3A and 3B can be used to check states outside the car on both sides, which have conventionally been checked with door mirrors or fender mirrors. The display apparatus 20 of the rear-view mirror unit 2 is arranged at a position corresponding to a position at which a rear-view mirror is provided for a conventional car, for example, such that the rear-view mirror unit 2 substitutes for the rear-view mirror. In other words, the rear-view mirror unit 2 can be used to check states outside the car on the rear side, which have conventionally been checked with the rear-view mirror.

The CID unit 4 includes a central processor 14 and a display device 24, for example. The display device 24 of the CID unit 4 is provided at a dashboard, for example, to serve as a display apparatus that displays navigational information and the like in a car navigation system. The display device 24 of the CID unit 4 may be provided as a display apparatus that outputs information similar to that indicated by gauges, such as a speedometer, a tachometer, a fuel gauge, a water-temperature gauge, and an odometer. The central processor 14 carries out various types of processing relating to display output performed by the display device 24 of the CID unit 4.

The CID unit 4 according to the first embodiment is coupled to the rear-view mirror unit 2 and the side-view mirror units 3A and 3B in a manner capable of transmitting and receiving data thereto and therefrom. Specifically, the CID unit 4 is coupled to the rear-view mirror unit 2 and the side-view mirror units 3A and 3B via an interface, such as high-definition multimedia interface (HDMI, registered trademark). This coupling form is given just as an example of a specific form of coupling of the CID unit 4 to the rear-view mirror unit 2 and the side-view mirror units 3A and 3B. The present invention is not limited thereto, and the coupling form may be appropriately modified. If any one of the display apparatus 20 of the rear-view mirror unit 2, the display apparatus 20A of the side-view mirror unit 3A, and the display apparatus 20B of the side-view mirror unit 3B is broken down (not operable), the display device 24 of the CID unit 4 displays and outputs data as a substitute for the display apparatus that is not operable.

Figure 4:
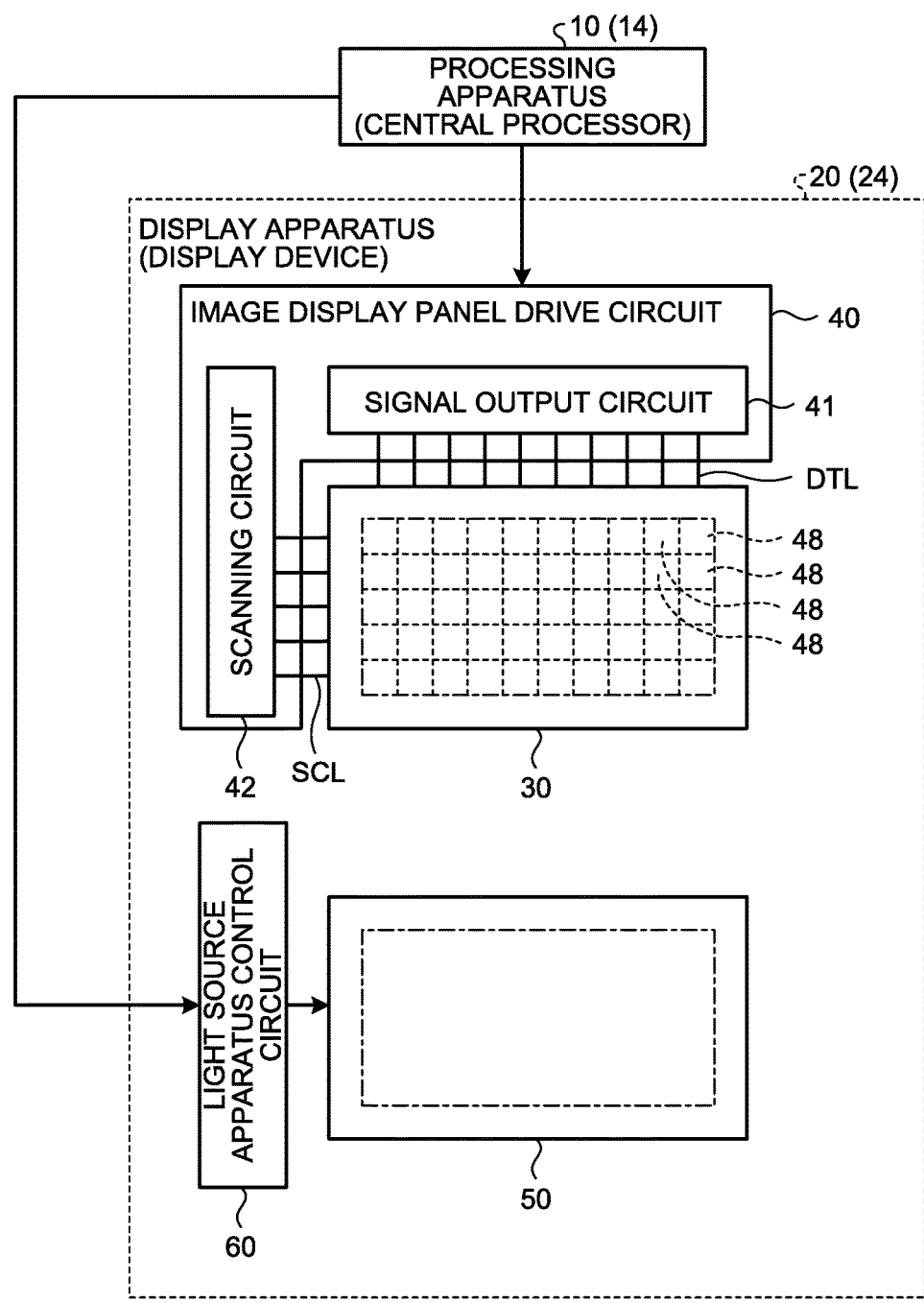
FIG. 4 is a block diagram of an exemplary configuration of the display apparatus.
Figure 5:
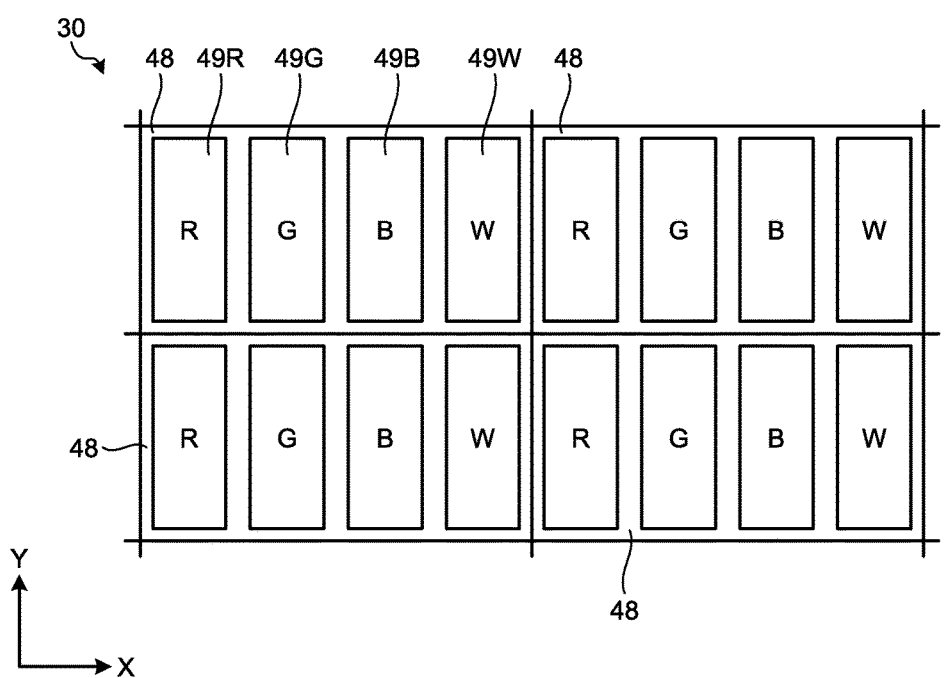
FIG. 5 is a diagram of a pixel array in an image display panel according to the first embodiment.
Figure 6:
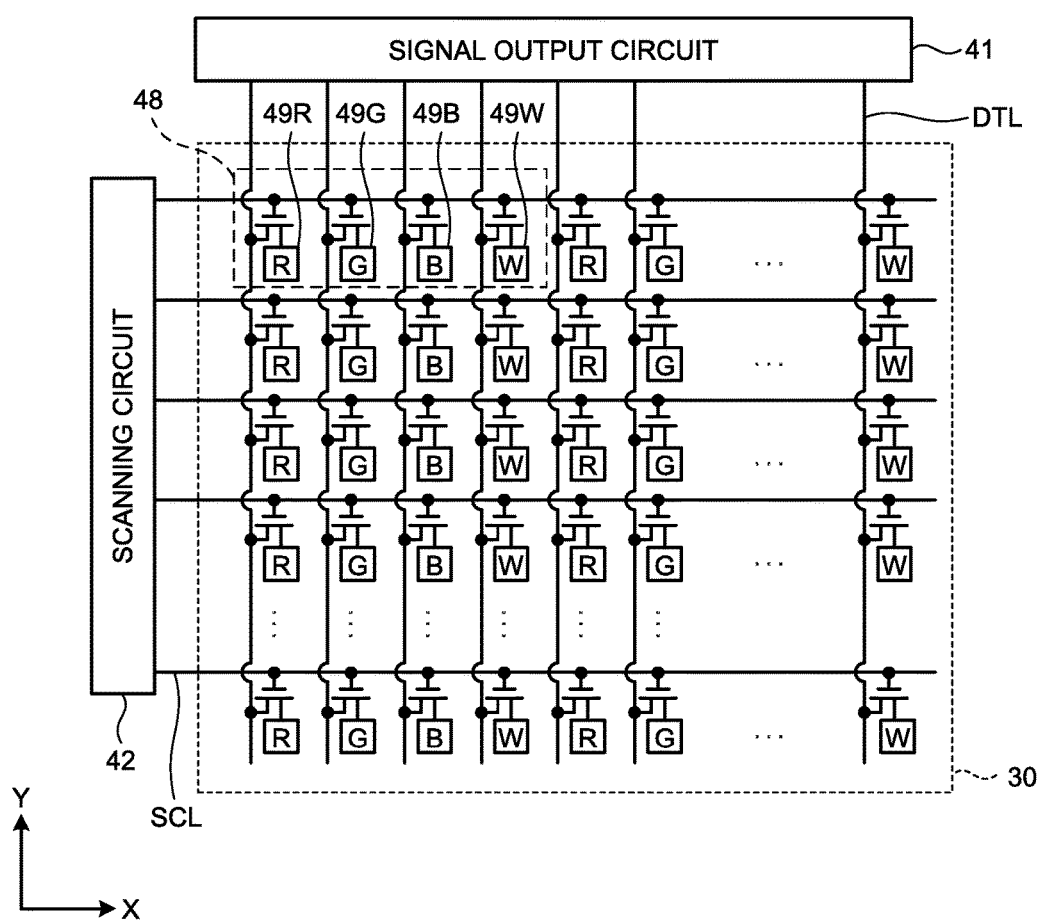
FIG. 6 is a conceptual diagram of the image display panel and an image-display panel drive circuit of the display apparatus according to the first embodiment.
Figure 7:
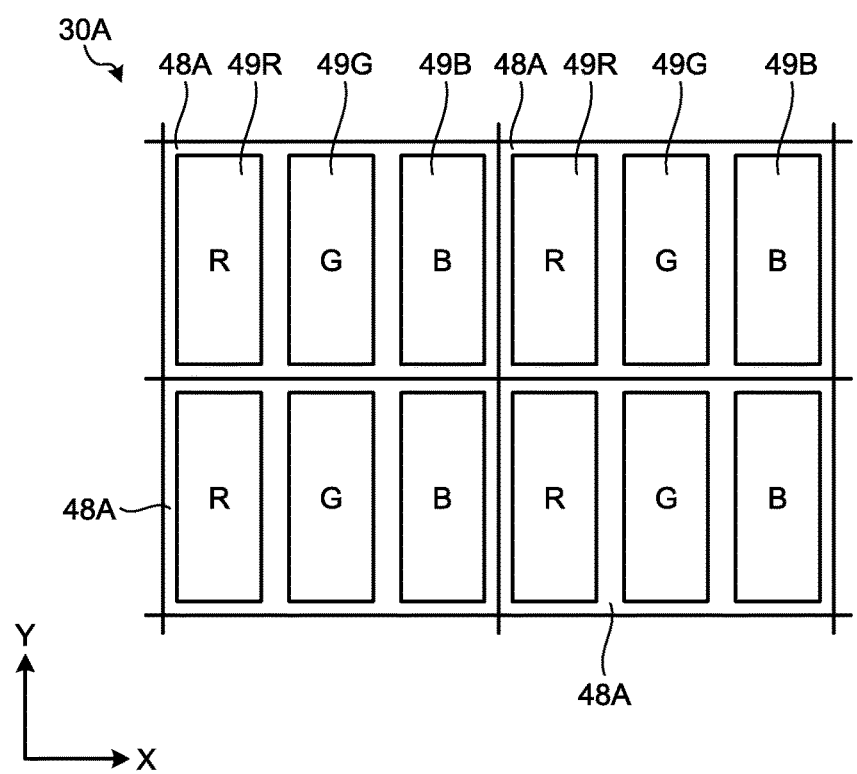
FIG. 7 is a diagram of another example of the pixel array in the image display panel according to the first embodiment.

FIG. 4 is a block diagram of an exemplary configuration of the display apparatus 20. FIG. 5 is a diagram of a pixel array in an image display panel 30 according to the first embodiment. FIG. 6 is a conceptual diagram of the image display panel 30 and an image-display panel drive circuit 40 of the display apparatus 20 according to the first embodiment. FIG. 7 is a diagram of another example of the pixel array in the image display panel 30 according to the first embodiment. The configuration of the display device 24 of the CID unit 4 according to the first embodiment is the same as that of the display apparatus 20 illustrated in FIGS. 4 to 7.

As illustrated in FIG. 4, the display apparatus 20 includes the image display panel 30, the image-display panel drive circuit 40, a light source apparatus 50, and a light-source apparatus control circuit 60. The image display panel 30 displays an image based on output signals from the processing apparatus 10. The image-display panel drive circuit 40 controls drive of the image display panel 30. The light source apparatus 50 illuminates the image display panel 30 from the back surface thereof, for example. The light-source apparatus control circuit 60 controls drive of the light source apparatus 50.

As illustrated in FIGS. 5 and 6, the image display panel 30 includes $P_0 \times Q_0$ pixels 48 ($P_0$ in the row direction and $Q_0$ in the column direction) arrayed in a two-dimensional matrix. In the example illustrated in FIGS. 5 and 6, the pixels 48 are arrayed in a matrix in a two-dimensional X-Y coordinate system. In this example, the row direction corresponds to an X-direction, and the column direction corresponds to a Y-direction. The pixel rows extending in the X-direction may be hereinafter referred to as lines. The total number of lines is equal to the total number of pixel rows in the image display panel 30.

The pixels 48 each include a first sub-pixel 49R, a second sub-pixel 49G, a third sub-pixel 49B, and a fourth sub-pixel 49W. The first sub-pixel 49R displays a first color component (e.g., red serving as a first primary color). The second sub-pixel 49G displays a second color component (e.g., green serving as a second primary color). The third sub-pixel 49B displays a third color component (e.g., blue serving as a third primary color). The fourth sub-pixel 49W displays a fourth color component (specifically, white). The first sub-pixel 49R, the second sub-pixel 49G, the third sub-pixel 49B, and the fourth sub-pixel 49W are hereinafter referred to as a sub-pixel 49 when they need not be distinguished from one another.

Specifically, the display apparatus 20 is a transmissive color liquid crystal display apparatus, for example. The image display panel 30 is a color liquid crystal display panel and includes first color filters, second color filters, and third color filters. The first color filters are arranged between the corresponding first sub-pixels 49R and an image observer and allow the first primary color to pass therethrough. The second color filters are arranged between the corresponding second sub-pixels 49G and the image observer and allow the second primary color to pass therethrough. The third color filters are arranged between the corresponding third sub-pixels 49B and the image observer and allow the third primary color to pass therethrough. The image display panel 30 includes no color filter between the fourth sub-pixels 49W and the image observer. The fourth sub-pixels 49W may be each provided with a transparent resin layer instead of a color filter. With the transparent resin layers, the image display panel 30 can prevent the occurrence of a large gap above the fourth sub-pixels 49W, otherwise a large gap occurs because no color filter is arranged for the fourth sub-pixels 49W.

The image display panel 30 in the example illustrated in FIG. 5 has the first sub-pixels 49R, the second sub-pixels 49G, the third sub-pixels 49B, and the fourth sub-pixels 49W arranged in a predetermined array (e.g., a stripe array). The structure and the arrangement of the first sub-pixel 49R, the second sub-pixel 49G, the third sub-pixel 49B, and the fourth sub-pixel 49W in one pixel 48 are not limited. The image display panel 30 may have the first sub-pixels 49R, the second sub-pixels 49G, the third sub-pixels 49B, and the fourth sub-pixels 49W arranged in an array similar to a diagonal array (mosaic array), for example. Alternatively, the image display panel 30 may have the first sub-pixels 49R, the second sub-pixels 49G, the third sub-pixels 49B, and the fourth sub-pixels 49W arranged in an array similar to a delta array (triangular array) or a rectangular array, for example. Like an image display panel 30A illustrated in FIG. 7, pixels 48A may each include the first sub-pixel 49R, the second sub-pixel 49G, and the third sub-pixel 49B and include no fourth sub-pixel 49W.

The image-display panel drive circuit 40 includes a signal output circuit 41 and a scanning circuit 42. The signal output circuit 41 is what is called a source driver and generates video signals for driving the pixels 48 based on image data output from the processing apparatus 10 (or the central processor 14). The image-display panel drive circuit 40 holds the video signals in the signal output circuit 41 and sequentially outputs them to the image display panel 30. The signal output circuit 41 is electrically coupled to the image display panel 30 by wires DTL. The pixels 48 operate such that the sub-pixels 49 have light transmittance corresponding to the video signals. The scanning circuit 42 is what is called a gate driver and outputs a scanning signal corresponding to a pixel row indicated by image data output from the processing apparatus 10 (or the central processor 14). Based on the output of scanning signals from the scanning circuit 42, the image-display panel drive circuit 40 controls turning on and off of switching elements (e.g., thin film transistors (TFT)) that control the operations (e.g., display luminance, and light transmittance in this example) of the sub-pixels in the image display panel 30. The scanning circuit 42 is electrically coupled to the image display panel 30 by scanning lines SCL. Turning on and off the switching elements via the corresponding scanning lines SCL by the scanning circuit 42 means turning on and off the switching elements in units of pixel rows (lines) provided along the scanning lines SCL. As described above, the display apparatus 20 can control turning on and off of display output in units of lines.

The light source apparatus 50 is arranged on the back surface side of the image display panel 30. The light source apparatus 50 emits light to the image display panel 30, thereby serving as a backlight that illuminates the image display panel 30. The light source apparatus 50 may be a front light arranged on the front surface side of the image display panel 30. As for cases where the image display panel 30 is a self-luminous display device, such as an organic light emitting diode (OLED) display device, the light source apparatus 50 is not required.

The light source apparatus 50 emits light to the entire surface of the image display panel 30 to illuminate the image display panel 30. The light-source apparatus control circuit 60 controls the illumination light amount of light output from the light source apparatus 50, for example. Specifically, the light-source apparatus control circuit 60 adjusts the duty ratio of the electric current, the voltage, or the signals supplied to the light source apparatus 50 based on light source apparatus control signals output from the processing apparatus 10. The light-source apparatus control circuit 60 thus controls the illumination light amount (intensity) of light emitted to the image display panel 30.

Figure 8:
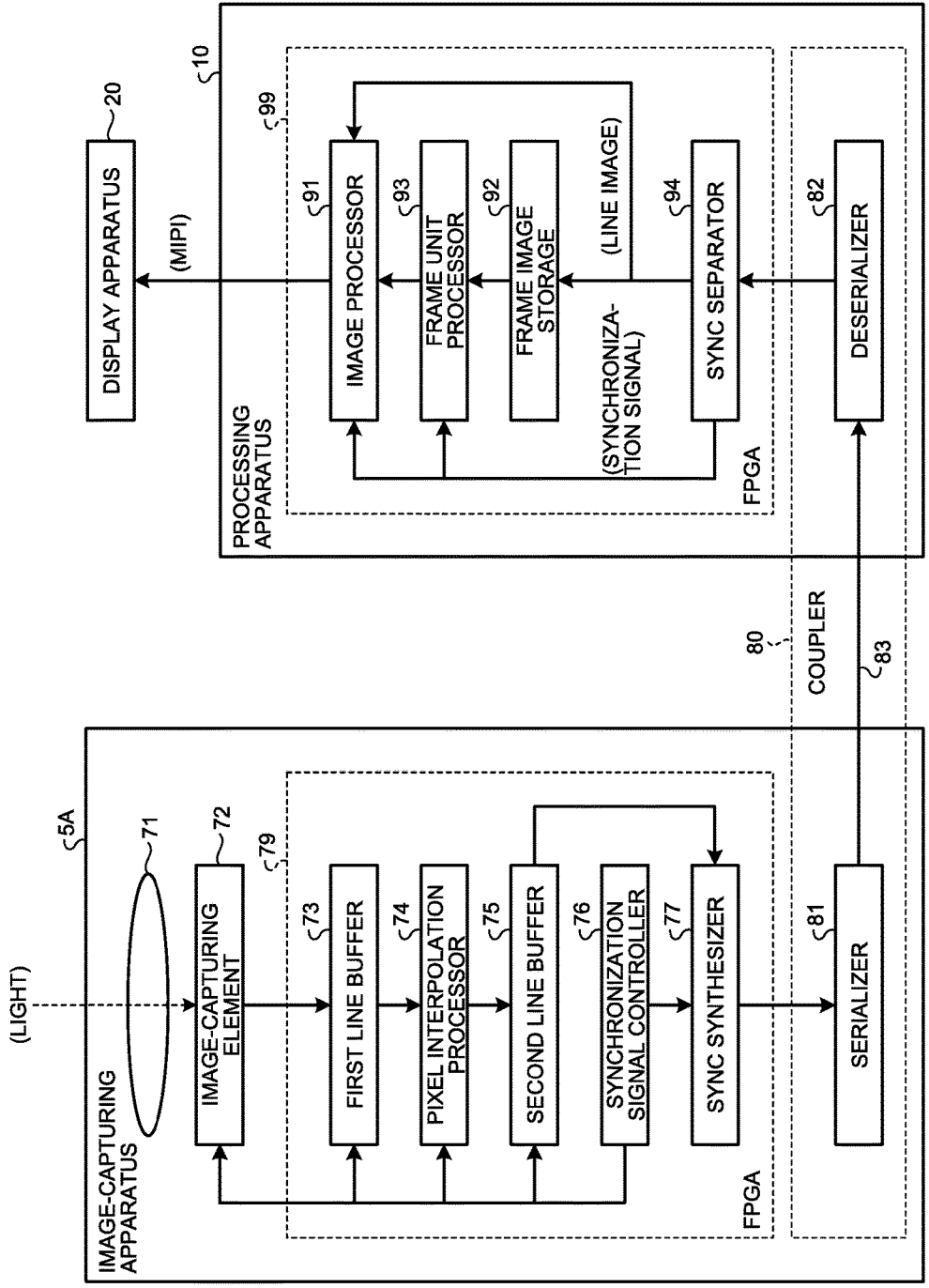
FIG. 8 is a diagram of an exemplary configuration of the rear-view mirror unit.

FIG. 8 is a diagram of an exemplary configuration of the rear-view mirror unit 2. The image-capturing apparatus 5A includes the lens 71, the image-capturing element 72, a first line buffer 73, a pixel interpolation processor 74, a second line buffer 75, and a synchronization signal controller 76, for example. The first line buffer 73 stores therein a predetermined number of line images captured by the image-capturing element 72. The pixel interpolation processor 74 performs pixel interpolation on the predetermined number of line images stored in the first line buffer 73. The second line buffer 75 stores therein the line images resulting from pixel interpolation. The synchronization signal controller 76 including at least a processor outputs synchronization signals to components of the rear-view mirror unit 2. The first line buffer 73, the pixel interpolation processor 74, the second line buffer 75, and the synchronization signal controller 76 are mounted on an integrated circuit, such as a field programmable gate array (FPGA) 79. Naturally, the first line buffer 73, the pixel interpolation processor 74, the second line buffer 75, and the synchronization signal controller 76 may be mounted on an integrated circuit other than the FPGA 79 or dedicated circuits corresponding thereto.

The image-capturing element 72 is a solid-state image-capturing element, such as a charge coupled device (CCD) image sensor or a complementary metal oxide semiconductor (CMOS) image sensor. The image-capturing element 72 outputs image data corresponding to the angle of view of the image-capturing apparatus 5A. More specifically, the image sensor (i.e., the CCD image sensor and/or the CMOS image sensor) includes color filters in the Bayer arrangement. The image sensor can capture an image of the outside of the car through the lens 71 to generate a color image. The image sensor generates a Bayer arrangement image of one frame composed of a plurality of pieces of pixel data. To output the Bayer arrangement image of one frame, the image sensor sequentially outputs data indicating output values of a plurality of elements (pixels) constituting the image sensor.

The first line buffer 73 is a buffer memory. The first line buffer 73 stores therein image data per the predetermined number of line images serving as part of a frame image captured by the image-capturing element 72. Specifically, the first line buffer 73 has storage capacity corresponding to the volume of data of the predetermined number of line images. The first line buffer 73 holds a plurality of pieces of pixel data sequentially output from the image-capturing element 72 per predetermined number of line images, thereby storing therein data corresponding to the predetermined number of line images. The image data stored in the first line buffer 73 is data of line images in the Bayer arrangement image.

Figure 9:
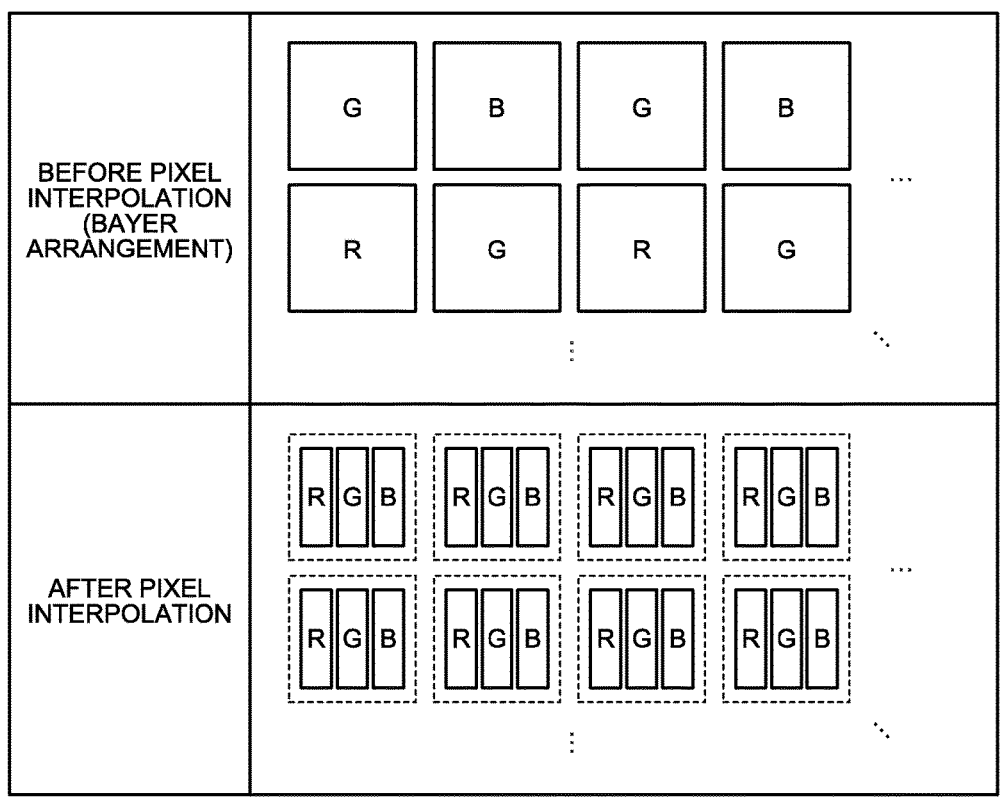
FIG. 9 is a diagram schematically illustrating the details of processing of pixel interpolation.

FIG. 9 is a diagram schematically illustrating the details of processing of pixel interpolation. As illustrated in FIG. 9, the pixel interpolation processor 74 performs pixel interpolation for generating image data in which one pixel has a plurality of pieces of color information based on the data of line images in the Bayer arrangement image stored in the first line buffer 73. The image data in which one pixel has a plurality of pieces of color information is image data in which a piece of pixel data includes information indicating the gradation values of respective sub-pixels of red (R), green (G), and blue (B), for example. This is given by way of example only, and the present invention is not limited thereto. The color information included in one pixel can be appropriately modified. In typical demosaicing, color information is truncated in conversion of a Bayer arrangement image into a general-purpose image format. In pixel interpolation, however, no color information is truncated. In other words, the pixel interpolation processor 74 generates image data in which one pixel includes a plurality of pieces of color information while substantially maintaining a color space of data resulting from analog/digital (A/D) conversion performed by the image-capturing element 72.

In FIG. 9, the pixel matrix illustrated in the upper figure indicates data of line images yet to be subjected to pixel interpolation, that is, data of line images in the Bayer arrangement image. The pixel matrix illustrated in the lower figure indicates data of line images resulting from pixel interpolation. In FIG. 9, one pixel row extending in the horizontal direction indicates one line image. The pixel interpolation processor 74 determines data of pixels (RGB pixels) in an m×n matrix (both m and n are natural numbers of 2 or larger) resulting from pixel interpolation based on the pixels of red (R), green (G), and blue (B) included in the m×n matrix in the Bayer arrangement image, for example. The pixel interpolation processor 74 according to the first embodiment processes data of line images of ten-odd rows in pixel interpolation of one time. This is given by way of example of the predetermined number, and the present invention is not limited thereto. The "predetermined number" can be appropriately modified within a range from one to (N−1) (N is the total number of lines in the image display panel 30, and N=$P_0$ is satisfied in the present embodiment).

The second line buffer 75 is a buffer memory. The second line buffer 75 stores therein the predetermined number of line images resulting from pixel interpolation. Specifically, the second line buffer 75 has storage capacity corresponding to the volume of data of the predetermined number of line images resulting from pixel interpolation. The predetermined number of line images resulting from pixel interpolation and stored in the second line buffer 75 are obtained by performing pixel interpolation on the predetermined number of line images yet to be subjected to pixel interpolation serving as part of the frame image captured by the image-capturing element 72. In other words, the predetermined number of line images stored in the second line buffer 75 correspond to part of the frame image captured by the image-capturing element 72.

The synchronization signal controller 76 outputs signals (synchronization signals) for causing the components of the rear-view mirror unit 2 to operate synchronously with one another. Specifically, the synchronization signals are clock signals output at a predetermined cycle, for example. The components in the image-capturing apparatus 5A of the rear-view mirror unit 2, such as the image-capturing element 72, and the components in the processing apparatus 10, which will be described later, perform processing in response to output timings of the synchronization signals. With this mechanism, the components in the rear-view mirror unit 2 operate synchronously with one another.

As illustrated in FIG. 8, the rear-view mirror unit 2 according to the first embodiment includes a coupler 80 used to transmit data between the image-capturing apparatus 5A and the processing apparatus 10. Specifically, as illustrated in FIG. 8, each of the image-capturing apparatus 5A and the processing apparatus 10 is independently provided as one electronic apparatus so that the image-capturing apparatus 5A and the processing apparatus 10 can be arranged separately from each other. The image-capturing apparatus 5A and the processing apparatus 10 provided independently are coupled in a manner capable of transferring data to each other via the coupler 80. The processing apparatus 10 may include the display apparatus 20. The coupler 80 is an interface that employs a wired transmission system, such as low voltage differential signaling (LVDS). More specifically, as illustrated in FIG. 8, the coupler 80 includes a serializer 81, a deserializer 82, and a signal line 83. The serializer 81 is provided in the image-capturing apparatus 5A, and the deserializer 82 is provided in the processing apparatus 10. The signal line 83 couples the serializer 81 and the deserializer 82. The serializer 81 reads data of the predetermined number of line images resulting from pixel interpolation via a parallel bus of the second line buffer 75 and converts the data into serial signals. The serializer 81 outputs the serial signals to the deserializer 82 via the signal line 83. The deserializer 82 converts the serial signals output from the serializer 81 into parallel signals and outputs them to the processing apparatus 10.

The coupler 80 according to the first embodiment also transmits the synchronization signals, which are output from the synchronization signal controller 76, from the image-capturing apparatus 5A to the processing apparatus 10. Specifically, the image-capturing apparatus 5A according to the first embodiment includes a SYNC synthesizer 77. The SYNC synthesizer 77 including at least a processor synthesizes the synchronization signals with the data output from the second line buffer 75 of the image-capturing apparatus 5A. The processing apparatus 10 according to the first embodiment includes a SYNC separator 94. The SYNC separator 94 separates the synchronization signals from the data received by the processing apparatus 10 via the coupler 80. The SYNC synthesizer 77 is mounted as one function of FPGA 79 in the image-capturing apparatus 5A, and the SYNC separator 94 is mounted as one function of FPGA 99 in the processing apparatus 10, for example.

The processing apparatus 10 includes an image processor 91, frame image storage 92, and a frame unit processor 93, for example. The image processor 91, the frame image storage 92, and the frame unit processor 93 are mounted on an integrated circuit, such as the FPGA 99. Naturally, the image processor 91, the frame image storage 92, and the frame unit processor 93 may be mounted on an integrated circuit other than the FPGA 99 or respective dedicated circuits.

The processing apparatus 10 according to the first embodiment is provided near the display apparatus 20. Specifically, the processing apparatus 10 and the display apparatus 20 are provided on a single substrate or in a manner coupled via wiring shorter than that of the coupler 80 in a case where they are provided on different substrates.

The image processor 91 performs image processing on the predetermined number of line images corresponding to part of the frame image captured by the image-capturing element 72. The image processor 91 sequentially outputs the image to the display apparatus 20 per predetermined number of line images and causes the display apparatus 20 to display the frame image. Specifically, the image processor 91 performs, as the image processing, line unit processing using the predetermined number of line images on the predetermined number of line images associated with the frame image to be output to the display apparatus 20. More specifically, the image processor 91 performs image processing, such as resizing, tone curve correction, color correction, and display image correction, as the line unit processing.

Resizing is processing for adjusting, based on the relation between the number of pixels in the frame image obtained by image-capturing and the number of pixels in the display apparatus 20, the number of pixels in the predetermined number of line images to the number of pixels in the display apparatus 20.

Tone curve correction is processing for correcting the gradation of each of the pixels in the predetermined number of line images using data indicating a tone curve prepared in advance, for example. As described above, the line unit processing includes gradation correction. In tone curve correction, the employed tone curve may be determined depending on conditions. The image processor 91, for example, may adjust the tone curve based on change patterns in brightness and coloration of light inside and outside the car varying depending on weather, such as sunny weather, cloudy weather, rain, and fog, on a period of time, such as daytime, sunset, and nighttime, and on environmental factors, such as the inside or the outside of a tunnel. Alternatively, tone curves corresponding to individual change patterns may be prepared in advance.

Color correction is processing for correcting the reproduced color of the predetermined number of line images while considering the tendency of color reproducibility (reproduced color) of the display apparatus 20, for example. As described above, the line unit processing includes color correction. In color correction, a user may determine the reproduced color resulting from correction. Specifically, the CID may include an input device through which the user can set the reproduced color, for example. The reproduced color set by the user through the input device may be reflected in color correction.

Display image correction is color conversion for enabling data of the predetermined number of line images resulting from the pixel interpolation to be output on the display apparatus 20 in which one pixel has sub-pixels of red (R), green (G), blue (B), and white (W). The data of the predetermined number of line images resulting from the pixel interpolation is image data in which one pixel has sub-pixels of red (R), green (G), and blue (B). Display image correction is processing for what is called WhiteMagic (registered trademark). Specifically, the image processor 91 identifies the lowest value of the gradation values of red (R), green (G), and blue (B) in the pixels constituting the line images. The image processor 91 subtracts the identified value from the gradation values of red (R), green (G), and blue (B) and determines the identified value to be the gradation value of white (W). Let us assume a case where the gradation values of red (R), green (G), and blue (B) are expressed by (R,G,B)=(p,q,r) and where p,q≥r is satisfied. In this case, the image processor 91 determines the gradation values of red (R), green (G), blue (B), and white (W) to be (R,G,B,W)= (p−r,q−r,0,r) in display image correction.

For the display apparatus 20 including the fourth sub-pixel 49W of white (W) as illustrated in the example in FIG. 5, the image processor 91 performs display image correction. By contrast, for the display apparatus 20 including no fourth sub-pixel 49W of white (W) as illustrated in the example in FIG. 7, the image processor 91 does not perform display image correction.

The frame image storage 92 serves as a holder that holds line images until acquisition of line images corresponding to a frame image of one frame is completed. Specifically, the frame image storage 92 is a rewritable storage device (e.g., a random access memory (RAM)), for example. The frame image storage 92 holds line images that make up a frame image of one frame until the frame image of one frame is completed by the line images resulting from pixel interpolation and sequentially transmitted.

The frame unit processor 93 performs processing (correction data generation) for performing image processing on the predetermined number of line images to be output to the display apparatus 20 using the frame image of one frame held by the holder. Specifically, the frame unit processor 93 performs distortion correction as frame unit processing. Distortion correction is processing for correcting distortion of an image that can be caused by image-capturing through the lens 71. In distortion correction, distortion can be reduced with higher accuracy by correcting an image per frame image so as to adjust the balance of the image than by correcting the image per line image. Consequently, in the present embodiment, distortion correction is performed as frame unit processing. Examples of distortion of an image include, but are not limited to, distortion in which an image expands outward (barrel aberration), distortion in which an image contracts inward (pincushion aberration), distortion in which a color not supposed to be present in an actual subject generates near ends of a frame image (color aberration), etc. The frame unit processor 93 can determine whether these distortions occur in the frame image based on a predetermined image analysis pattern. The frame unit processor 93 is provided in advance with a correction pattern to eliminate distortion when it is determined that the distortion occurs. That is, the correction pattern is data indicating how the image should be corrected to reduce the distortion of the image.

The frame unit processor 93 performs adjustment of the brightness by auto exposure (AE) and adjustment of the reference of white by auto white balance (AWB) as frame unit processing. Let us assume a case where information on the brightness of an image required for AE processing and the coloration of an image required for AWB processing is obtained from the predetermined number of line images. If the line images happen to be a partial image inclining to specific brightness and coloration, correct information may possibly fail to be provided. To address this, the frame unit processor 93 obtains the information using an image of one frame before performing AE processing and AWB processing, thereby performing image processing more appropriately. As described above, the frame unit processing includes distortion correction, AE processing, and AWB processing. The frame unit processor 93 may perform one or more kinds of frame unit processing. Thus, the frame unit processor 93 may perform at least one of distortion correction, AE processing, and AWB processing, for example.

The frame unit processor 93 generates correction data used to correct the predetermined number of line images based on a frame image as a result of distortion correction, AE processing, and AWB processing. The frame unit processor 93 uses the correction data for the predetermined number of line images displayed subsequently. The FPGA 99 of the processing apparatus 10, for example, includes temporary storage that stores therein the correction data. The frame unit processor 93 stores the correction data in the temporary storage.

The frame unit processor 93 according to the first embodiment counts the synchronization signals output from the synchronization signal controller 76, such that the frame unit processor 93 identifies a timing when a frame image of one frame is stored in the frame image storage 92 and reads the frame image. If the frame unit processor 93 reads the frame image, the frame image storage 92 holds the predetermined number of line images that make up a frame image of the next frame until all the line images that make up the frame image of the next frame are stored therein.

Figure 10:
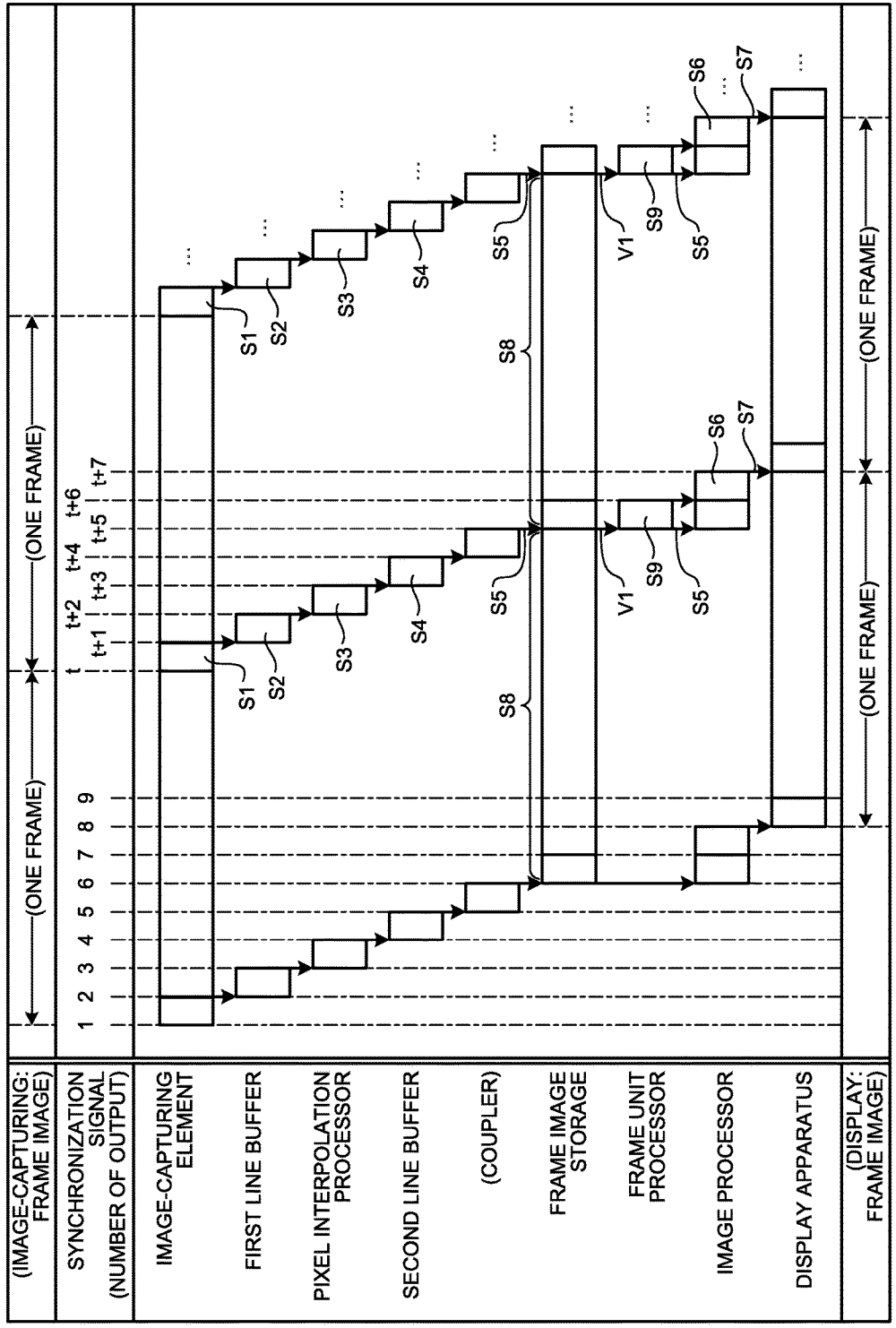
FIG. 10 is a timing chart of synchronization signals and operations of parts in the rear-view mirror unit.

FIG. 10 is a timing chart of the synchronization signals and the operations of parts in the rear-view mirror unit 2. As illustrated in FIG. 10, the image-capturing element 72 performs image-capturing first. The image-capturing element 72 outputs a predetermined number of line images that make up a Bayer arrangement image every time a clock ticks by a synchronization signal. If the image-capturing element 72 outputs the predetermined number of line images that make up the Bayer arrangement image in response to the t-th (t is a natural number) synchronization signal (Step S1), the first line buffer 73 stores therein the predetermined number of line images, which make up the Bayer arrangement image output from the image-capturing element 72 in response to the t-th synchronization signal, at a timing of the t+1-th synchronization signal (Step S2). The pixel interpolation processor 74 reads the line images, which have been stored in the first line buffer 73 at the timing of the t+1-th synchronization signal, at a timing of the t+2-th synchronization signal to perform pixel interpolation (Step S3). The second line buffer 75 stores therein, at a timing of the t+3-th synchronization signal, the predetermined number of line images subjected to pixel interpolation by the pixel interpolation processor 74 at the timing of the t+2-th synchronization signal (Step S4).

The coupler 80 transmits the data stored in the second line buffer 75 of the image-capturing apparatus 5A to the processing apparatus 10 (Step S5). The processing apparatus 10 receives, at a certain timing after the t+3-th synchronization signal, the line images stored in the second line buffer 75 at the timing of the t+3-th synchronization signal via the coupler 80. In the description with reference to FIG. 10, the coupler 80 performs processing for data transmission at the timing of the t+4-th synchronization signal, and the processing apparatus 10 receives the line images at a timing of the t+5-th synchronization signal. The timing when the processing apparatus 10 receives the line images stored in the second line buffer 75 at the timing of the t+3-th synchronization signal depends on the processing speed and the transmission speed of the coupler 80.

The image processor 91 sequentially performs the line unit processing on the predetermined number of line images received by the processing apparatus 10 (Step S6). The image processor 91 sequentially outputs the line images resulting from the line unit processing to the display apparatus 20 at timings corresponding to the synchronization signals (Step S7). The image display panel 30 of the display apparatus 20 sequentially displays the line images output from the image processor 91, thereby performing display output of all the line images that make up a frame image of one frame. The frame image is thus completed in the display area of the image display panel 30. In the example illustrated in FIG. 10, the frame image storage 92 and the image processor 91 receive the predetermined number of line images at the timing of the t+5-th synchronization signal, the image processor 91 performs image processing at a timing of the t+6-th synchronization signal, and the predetermined number of line images resulting from image processing are output to the display apparatus 20 at a timing of the t+7-th synchronization signal. FIG. 10 illustrates transition of processing relating to the first line image in each frame performed in response to the synchronization signals. In effect, the same process is performed each time per predetermined number of line images, the line images making up the frame image.

The frame image storage 92 holds the predetermined number of line images while the image processor 91 is performing the line unit processing (Step S8). If all the line images that make up a frame image of one frame are stored in the frame image storage 92, the frame unit processor 93 generates correction data (Step S9). In FIG. 10, the arrow V1 indicates reading of the frame image from the frame image storage 92 performed by the frame unit processor 93. After the correction data is generated, the image processor 91 performs both image correction using the correction data and the line unit processing on the predetermined number of line images at Step S6 and sequentially outputs the data resulting from image processing to the display apparatus 20. As described above, the image processor 91 is configured to perform the image processing including frame unit processing using the frame image of one frame on the predetermined number of line images associated with the frame image to be output to the display apparatus 20.

In the first embodiment, no correction data is generated yet at the timing when the frame image of the first frame is output to the display apparatus 20. As a result, correction using correction data is not performed in displaying the frame image of the first frame and the predetermined number of line images that make up the frame image of the first frame. By contrast, at timings when the frame image of the u-th frame (u is a natural number of 2 or larger) and the frames subsequent thereto are output to the display apparatus 20, the frame unit processor 93 already generates the correction data using the frame image of the (u−1)-th frame. The image processor 91 performs both the image correction using the correction data generated using the frame image of the (u−1)-th frame and the line unit processing on the predetermined number of line images that make up the frame image of the u-th frame and the frames subsequent thereto.

While the explanation has been made of the image correction (frame unit processing) performed using the correction data generated using the frame image of the (u−1)-th frame with reference to FIG. 10, the correction data is only required to be generated using a frame image one or more frames before a frame image made up of the line images to be corrected. The image processor 91, for example, may perform the image correction (frame unit processing) on the line images of the (u+1)-th frame using the correction data generated using the frame image of the (u−1)-th frame. Alternatively, the image processor 91 may perform the image correction (frame unit processing) on a plurality of frame images using the correction data generated based on results of processing performed by the frame unit processor 93. Specifically, for example, the image processor 91 may perform the image correction (frame unit processing) using data obtained by averaging parameters indicated by the correction data of the u-th frame and the (u−1)-th frame as "correction data generated based on results of analysis performed on a plurality of frame images (frame images one or more frames before a frame image made up of the line images to be corrected)" in the image correction (frame unit processing) performed on the line images of the (u+1)-th frame. The correction is performed considering both a frame image one frame before a frame image made up of the line images to be corrected and a frame image two frames before the frame image made up of the line images to be corrected in this example. Frame images three or more frames before the frame image made up of the line images to be corrected may also be used for the image correction (frame unit processing). As described above, the frame unit processing can be performed using a frame image one or more frames before a frame image made up of the line images to be corrected.

The use of the correction data allows the frame unit processing using the correction data generated using frame images of two or more frames to be performed with the frame image storage 92 having storage capacity corresponding to a frame image of one frame. As a result, the frame image storage 92 does not require storage capacity of a plurality of frames, thereby providing the processing apparatus 10 at a lower cost.

The image processor 91 according to the first embodiment is coupled to the display apparatus 20 via mobile industry processor interface (MIPI, registered trademark), for example. The image processor 91 sequentially outputs the data of line images resulting from the line unit processing to the display apparatus 20 via the MIPI. The data is transmitted via the MIPI synchronously with the synchronization signals. Specifically, a clock indicated by a self-clock or an embedded clock conforming to the MIPI standards, for example, is adjusted to the clock of the synchronization signals. As described above, the components of the rear-view mirror unit 2 synchronize with the synchronization signals output from the synchronization signal controller 76, thereby sequentially performing processing and outputting data at timings corresponding to the synchronization signals. The frame rate of the image display panel corresponds to the clock of the synchronization signals. While the frame rate according to the first embodiment is assumed to be 120 fps to 240 fps, for example, this is given by way of example of the frame rate. The present invention is not limited thereto, and the frame rate may be appropriately modified.

Synchronization control on the display apparatus 20 according to the synchronization signals may be performed by a method other than the method using the MIPI. To output the synchronization signals to a circuit (e.g., a driver IC) that controls operations of the display apparatus 20, wiring may be provided between the processing apparatus 10 and the display apparatus 20, for example.

As described above, the components of the rear-view mirror unit 2 can sequentially perform processing and output data at timings corresponding to the synchronization signals. With this mechanism, the present embodiment can divide pixel information constituting the data of the predetermined number of line images into packets and transmit them. Consequently, data can be transmitted without depending on the bit number required for transmission of the pixel information.

While the explanation has been made of the configuration and the processing of the rear-view mirror unit 2, the configuration and the processing of the side-view mirror units 3A and 3B are the same as those of the rear-view mirror unit 2. In other words, the configuration of the processing apparatus 10 is the same as that of the processing apparatuses 10A and 10B. The configuration of the display apparatus 20 is the same as that of the display apparatuses 20A and 20B. The configuration of the image-capturing apparatus 5A is the same as that of the image-capturing apparatuses 5B and 5C. The side-view mirror unit 3A, however, has two image-capturing apparatuses 5 coupled to the processing apparatus 10A via the coupler 80. The side-view mirror unit 3B has two image-capturing apparatuses 5 coupled to the processing apparatus 10B via the coupler 80. Specifically, the processing apparatus 10 of the rear-view mirror unit 2 is coupled to the rear image-capturing apparatus 5A illustrated in FIG. 2. By contrast, the processing apparatus 10A of the side-view mirror units 3A is coupled to the rear image-capturing apparatus 5A illustrated in FIG. 2 and the side image-capturing apparatus 5B, and the processing apparatus 10B of the side-view mirror unit 3B is coupled to the rear image-capturing apparatus 5A illustrated in FIG. 2 and the side image-capturing apparatus 5C. The two side image-capturing apparatuses 5B and 5C are coupled to the processing apparatuses 10A and 10B of the side-view mirror units 3A and 3B, respectively. Specifically, the respective positions of the display apparatuses 20A and 20B of the side-view mirror units 3A and 3B with respect to the windshield FG correspond to the respective positions of the side image-capturing apparatuses 5B and 5C coupled to the processing apparatuses 10A and 10B of the side-view mirror units 3A and 3B with respect to the windshield FG. In other words, the processing apparatus 10B of the side-view mirror unit 3B including the display apparatus 20B provided on the right of the windshield FG is coupled to the image-capturing apparatus 5C provided on the right. Similarly to this, the processing apparatus 10A of the side-view mirror unit 3A including the display apparatus 20A provided on the left of the windshield FG is coupled to the image-capturing apparatus 5B provided on the left.

The respective image processors 91 of the processing apparatuses 10A and 10B of the side-view mirror units 3A and 3B perform synthesis processing besides the processing performed by the image processor 91 of the rear-view mirror unit 2. Synthesis processing is processing for synthesizing the predetermined number of line images captured by one of the image-capturing apparatuses 5 and the predetermined number of line images captured by the other of the image-capturing apparatuses 5 to generate the predetermined number of line images that can be output to one display apparatus. Specifically, the image processor 91 of the processing apparatus 10A of the side-view mirror unit 3A synthesizes the predetermined number of line images (rear image) received from the rear image-capturing apparatus 5A and the predetermined number of line images (side image) received from the side image-capturing apparatus 5B such that an image-capturing portion of the rear image and an image capturing portion of the side image that correspond to the same subject are superposed, for example. In the same manner, the image processor 91 of the processing apparatus 10B of the side-view mirror unit 3B synthesizes the predetermined number of line images (rear image) received from the rear image-capturing apparatus 5A and the predetermined number of line images (side image) received from the side image-capturing apparatus 5C such that an image-capturing portion of the rear image and an image capturing portion of the side image that correspond to the same subject are superposed, for example. Because the angle of view of the rear image-capturing apparatus 5A partially overlaps with the angles of view of the side image-capturing apparatuses 5B and 5C, the images include the same subject.

The frame image storage 92 of each of the side-view mirror units 3A and 3B has storage capacity for holding frame images captured by two image-capturing apparatuses. The frame unit processor 93 of each of the side-view mirror units 3A and 3B may generate correction data individually for the respective frame images captured by the two image-capturing apparatuses 5. In this case, the image processor 91 applies correction data generated from the frame image captured by the rear image-capturing apparatus 5A to the line images received from the rear image-capturing apparatus 5A. The image processor 91 applies correction data generated from the frame image captured by the side image-capturing apparatus 5B (or the side image-capturing apparatus 5C) to the line images received from the side image-capturing apparatus 5B (or the side image-capturing apparatus 5C). After performing the processing described above, the image processor 91 performs synthesis processing. The frame unit processor 93 may generate one piece of correction data considering frame images captured by two image-capturing apparatuses. Specifically, the frame unit processor 93 may calculate a value (e.g., an intermediate value) considering values relating to correction of the brightness and the color indicated by pieces of correction data generated individually for the respective frame images captured by the two image-capturing apparatuses 5 and use the calculated value as one piece of correction data. In this case, the image processor 91 applies the correction data to the predetermined number of line images resulting from synthesis processing.

A plurality of image-capturing apparatuses 5 may be coupled to the processing apparatus 10 of the rear-view mirror unit 2. In this case, the frame image storage 92 of the rear-view mirror unit 2 has storage capacity that can hold frame images the number of which corresponds to that of image-capturing apparatuses 5 coupled to the processing apparatus 10. In this case, the image processor 91 of the rear-view mirror unit 2 performs the synthesis processing described above.

The CID unit 4 according to the first embodiment serves as one component of the display system 1 and controls the operations of the rear-view mirror unit 2 and the side-view mirror units 3A and 3B. Specifically, the CID unit 4 starts simultaneously with start of the engine of the car, for example. The central processor 14 of the CID unit 4 starts the rear-view mirror unit 2 and the side-view mirror units 3A and 3B immediately after the central processor 14 of the CID unit 4 starts, thereby enabling the user to check the states outside the car through the display apparatuses 20, 20A, and 20B. The central processor 14 ends the operations of the rear-view mirror unit 2 and the side-view mirror units 3A and 3B simultaneously with stop of the engine and ends the operations of the CID unit 4 itself.

If any one of the display apparatus 20 of the rear-view mirror unit 2, the display apparatus 20A of the side-view mirror unit 3A, and the display apparatus 20B of the side-view mirror unit 3B is broken down (not operable), the display device 24 of the CID unit 4 displays and outputs data as a substitute for the display apparatus that is not operable. Specifically, the CID unit 4 includes a detector capable of detecting failures of the display apparatuses 20, 20A, and 20B, such as a failure in which any one of the display apparatus 20 of the rear-view mirror unit 2, the display apparatus 20A of the side-view mirror unit 3A, and the display apparatus 20B of the side-view mirror unit 3B fails to be powered on. In this case, the central processor 14 of the CID unit 4 obtains image data output from one processing apparatus among the processing apparatuses 10 10A, and 10B, the one processing apparatus being included in one mirror unit among the rear-view mirror unit 2, the side-view mirror units 3A and 3B, the one mirror unit including the display apparatus in which the failure is detected by the detector. The central processor 14 outputs the obtained image data to the display device 24 of the CID unit 4. The substitute output by the display device 24 of the CID unit 4 may be manually performed by the user. In this case, the CID unit 4 receives instructions to output data as a substitute for the respective display apparatuses 20, 20A, and 20B of the rear-view mirror unit 2 and the side-view mirror units 3A and 3B from the user through an input device, for example. If the instructions are received, the display device 24 performs substitute output. The instructions preferably include specification information indicating one of the display apparatuses 20, 20A, and 20B for which the display device 24 substitutes. More specifically, the display device 24 of the CID unit 4 may be a display apparatus with a touch panel, and the CID unit 4 may receive, through the touch panel, the instructions indicating one of the display apparatuses 20, 20A, and 20B for which the display device 24 substitutes. As described above, the CID unit 4 including the display device 24 serves as one component of the display system 1 and displays and outputs, if any one of the display apparatuses 20, 20A, and 20B of the display system 1 is broken down (not operable), data as a substitute for the display apparatus that is not operable.

The specific form of substitute output may be arbitrarily determined. If one of the display apparatuses is broken down (not operable), for example, the display device 24 of the CID unit 4 may divide the display area into two sections, thereby performing display output for the CID unit 4 and display output of a substitute for the display apparatus, which is not operable, simultaneously. The substitute output is not necessarily performed by the CID unit 4. The display area of the display apparatuses 20 of the rear-view mirror unit 2, the display apparatus 20A of the side-view mirror unit 3A, or the display apparatus 20B of the side-view mirror unit 3B may be divided into two sections, and one of the sections in the divided display area may perform substitute output. If two or more display apparatuses are broken down (not operable), the display area may be divided into three or more sections.

As described above, according to the first embodiment, encoding or decoding is not performed on an image captured by the image-capturing element 72 in displaying the image on the display apparatuses 20, 20A, and 20B. Thus, according to the first embodiment, frame delay can be reduced. According to the first embodiment, no truncation of information is performed along with encoding because encoding or decoding is not performed on an image. Thus, the display system 1 of the first embodiment can exploit the potential in color recognition of the image-capturing element 72 of the image-capturing apparatus 5.

Figure 13:
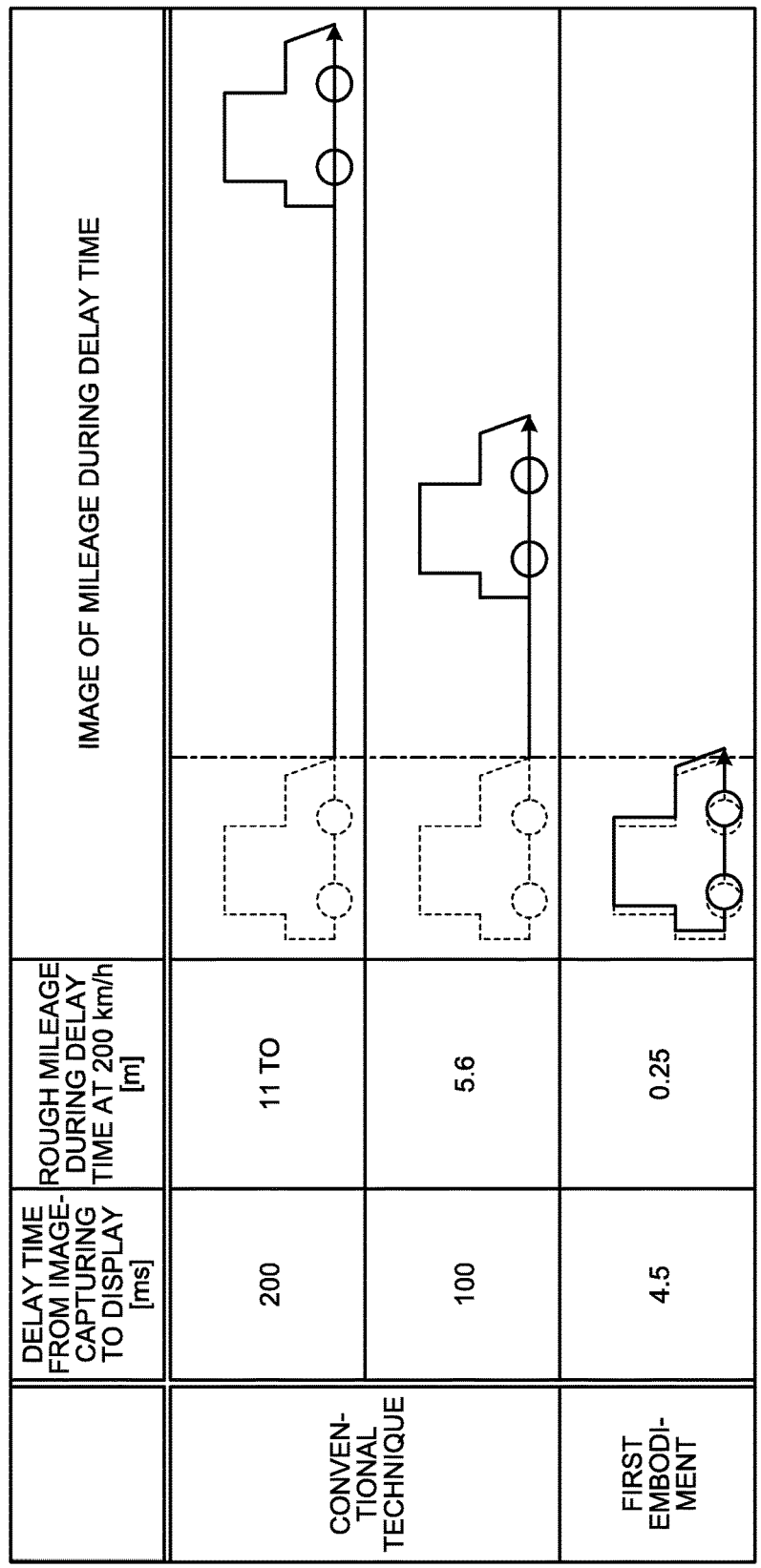
FIG. 13 is a diagram schematically illustrating an exemplary relation between a running vehicle and delay.

FIG. 11 is a diagram schematically illustrating a conventional mechanism of data transfer including encoding and decoding. FIG. 12 is a diagram schematically illustrating a mechanism of data transfer in the display system 1 according to the first embodiment. FIG. 13 is a diagram schematically illustrating an exemplary relation between a running vehicle and delay. As illustrated in FIG. 11, an image-capturing apparatus of the conventional system performs encoding accompanied with gamma conversion to output data. Because the data is output per frame, the conventional system has frame delay corresponding to the time for one frame and the encoding, for example, when the image-capturing apparatus outputs the data. To perform image processing on the data output from the image-capturing apparatus, the conventional system performs decoding and inverse gamma conversion on the image data output from the image-capturing apparatus before performing the image processing and then performs encoding accompanied with gamma conversion again. As a result, the conventional system further has frame delay corresponding to the time for the inverse gamma conversion and the encoding accompanied with gamma conversion. Because the data is also output per frame, the conventional system further has frame delay corresponding to the waiting time captured until image processing on an image of one frame is completed. The display apparatus in the conventional system needs to perform decoding and other processing. As a result, the conventional system further has frame delay corresponding to the time for the decoding and other processing. In a case where the display apparatus further performs image processing and other processing independently, the conventional system further has frame delay corresponding to the processing time for the image processing and other processing. As described above, the conventional system has frame delay caused by the processing, such as encoding and gamma conversion, performed in transmission of data between the apparatuses. If the data displayed by the system having frame delay is used instead of a rear-view mirror, for example, the display output contents that can be checked in the running car correspond to the states far behind the present position. The following describes the phenomenon with reference to FIG. 13. If 200 msec (hereinafter, denoted by ms) is elapsed from an image-capturing timing to a display output timing because of frame delay, the contents displayed in the car running at 200 (km/h) correspond to the contents obtained when the car was running at a position behind the present position by 11 m or farther. If 100 ms is elapsed from the image-capturing timing to the display output timing, the contents displayed in the car running at 200 (km/h) correspond to the contents obtained when the car was running at a position behind the present position by substantially 5.6 m. Such a significant gap between the position of the car and the display contents is not desirable for checking the states outside the car. The conventional system truncates color information other than the color space defined by the format in the encoding. In the conventional system, part of the color information obtained in the image-capturing is already lost in the image processing. Consequently, the conventional system fails to perform display output while fully exploiting the performance of the image-capturing element.

By contrast, as illustrated in FIG. 12, the first embodiment does not perform encoding or gamma conversion in transmission of data between the apparatuses. As a result, in the first embodiment, no frame delay caused by encoding, decoding, gamma conversion, and inverse gamma conversion occurs. Thus, according to the first embodiment, frame delay can be reduced. If 4.5 ms is elapsed from the image-capturing timing to the display output timing by pixel interpolation, for example, the contents displayed in the car running at 200 (km/h) correspond to the contents obtained when the car was running at a position behind the present position by only 0.25 m as illustrated in the example in FIG. 13. The display contents can be practically used to check the states outside the car without any problems. In the first embodiment, no truncation of information is carried out along with encoding because encoding or decoding is performed on an image. Thus, the color information obtained in image-capturing according to the performance of the image-capturing element 72 can be faithfully reproduced. As described above, in the first embodiment, the potential in color recognition of the image-capturing element 72 of the image-capturing apparatus 5 can be exploited.

Gamma conversion may be performed as frame unit processing. The gamma conversion in this case is performed for correction (gamma correction) for adjusting the brightness of an image output by the display apparatus 20 and is different from gamma conversion for adjusting the image to the sRGB color space.

In the first embodiment, frame unit processing is performed on a predetermined number of line images using a frame image of one or more frames before a frame image made up of the line images. Thus, with the predetermined number of line images, display output can be start without any waiting time captured until an image of one frame is completed to perform the frame unit processing. Consequently, the display system 1 of the first embodiment can reduce delay until the captured image is displayed and output.

In the first embodiment, line unit processing using the predetermined number of line images is performed on the predetermined number of line images to be output to the display apparatuses 20, 20A, and 20B. Thus, the display quality in output of the data can be stabilized. The line unit processing includes one or more of gradation correction and color correction. Consequently, the display system 1 of the first embodiment can facilitate its stabilizing the display quality depending on the processing contents.

The frame unit processing includes one or more of distortion correction, AE processing, and AWB processing of an image. Consequently, the display system 1 of the first embodiment can facilitate its stabilizing the display quality depending on the processing contents.

The first embodiment includes the coupler 80 used to transmit data, thereby facilitating its securing the distance between the apparatuses. The coupler 80 employs a higher-speed transmission system, thereby increasing the transmission speed between the apparatuses.

The display system 1 is provided at a car, and the image-capturing apparatus 5 captures an image of the outside of the car. Thus, the display apparatuses 20, 20A, and 20B can display and output the views outside the car. As described above, the display system 1 of the first embodiment can reduce frame delay and exploit the potential in color recognition of the image-capturing element 72 of the image-capturing apparatus 5. Consequently, the display system 1 of the first embodiment can provide an image having more abundant color information obtained by capturing the views outside the car to the user in the car, such as a driver, with less delay.

If any one of the display apparatuses 20, 20A, and 20B is broken down (not operable), at least one of the operable display apparatuses (e.g., the display device 24 of the CID unit 4) displays and outputs data as a substitute for the display apparatus that is not operable. Consequently, the display system 1 of the first embodiment can secure the reliability of display output.

In the first embodiment, images captured by a plurality of image-capturing apparatuses 5 are synthesized. Consequently, the display system 1 of the first embodiment can cover an image-capturing area wider than that in image-capturing performed by one image-capturing apparatus 5.

Second Embodiment

Figure 14:
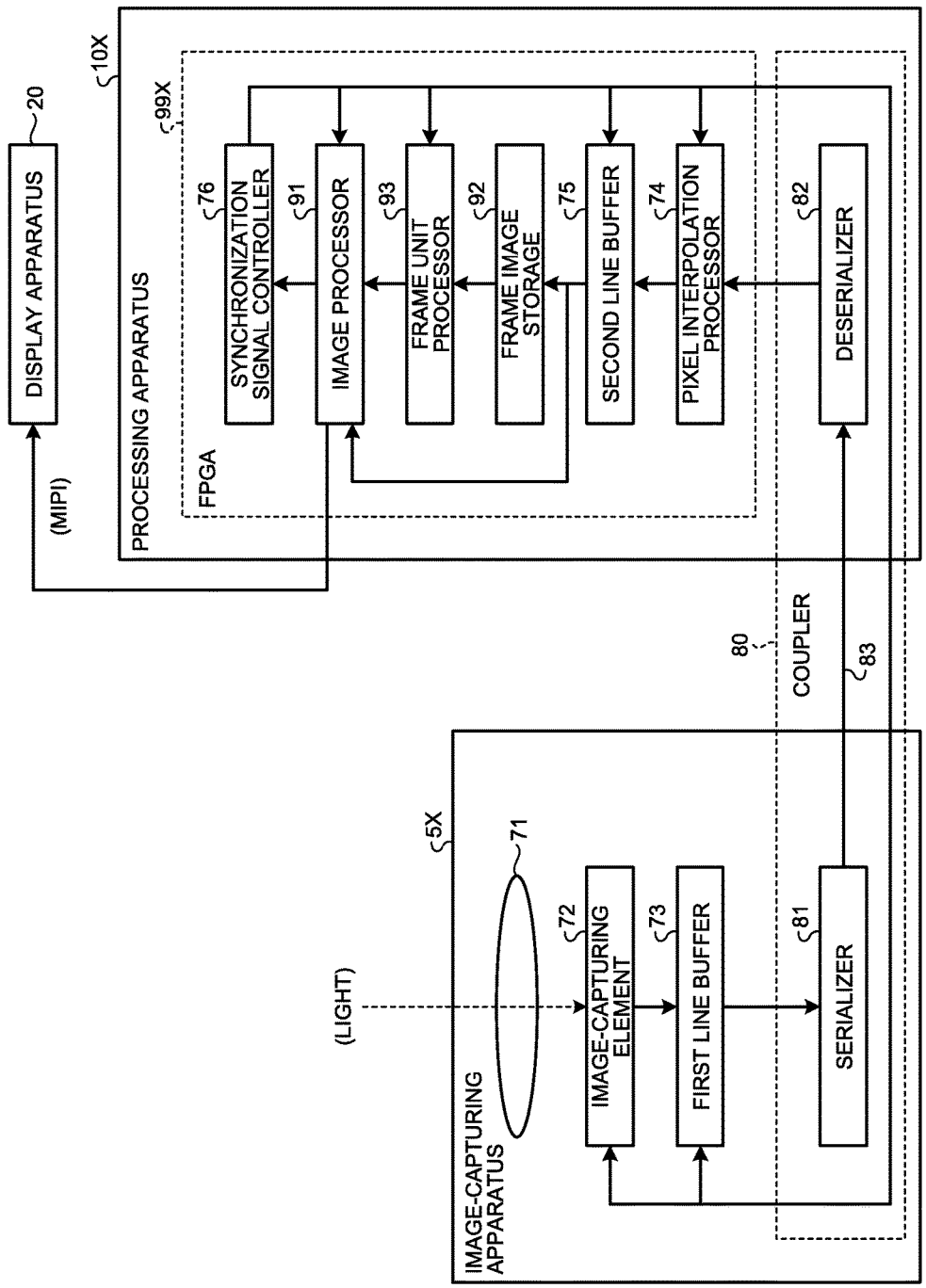
FIG. 14 is a diagram of a configuration of the rear-view mirror unit according to a second embodiment of the present invention.

The following describes the display system according to a second embodiment of the present invention with reference to FIG. 14. The same components as those according to the first embodiment are denoted by the same reference numerals, and explanation thereof is omitted.

FIG. 14 is a diagram of a configuration of the rear-view mirror unit 2 according to the second embodiment. In the second embodiment, an image-capturing apparatus 5X is employed instead of the image-capturing apparatus 5 according to the first embodiment. In the second embodiment, a processing apparatus 10X is employed instead of the processing apparatus 10 according to the first embodiment. As illustrated in FIG. 14, the processing apparatus 10X may include the pixel interpolation processor 74 and the second line buffer 75 included in the image-capturing apparatus 5 according to the first embodiment. Specifically, an FPGA 99X of the processing apparatus 10X according to the second embodiment, for example, may have functions of the pixel interpolation processor 74 and the second line buffer 75. Each of the image-capturing apparatus 5X and the processing apparatus 10X according to the second embodiment is independently provided as one electronic apparatus so that the image-capturing apparatus 5X and the processing apparatus 10X can be arranged separately from each other. The image-capturing apparatus 5X and the processing apparatus 10X provided independently are coupled in a manner capable of transferring data to each other via the coupler 80. The processing apparatus 10X may include the display apparatus 20. In this case, the coupler 80 transmits data of line images in the Bayer arrangement image stored in the first line buffer 73 to the processing apparatus 10X. In other words, the coupler 80 according to the second embodiment transmits data of the predetermined number of line images yet to be subjected to Bayer conversion. In the processing apparatus 10X that receives the data of line images in the Bayer arrangement image, the pixel interpolation processor 74 performs pixel interpolation on the data, and the second line buffer 75 stores therein the data of line images resulting from pixel interpolation. In other words, the processing apparatus 10X according to the second embodiment performs pixel interpolation on the line images yet to be subjected to Bayer conversion. The data of the predetermined number of line images stored in the second line buffer 75 is transferred to the image processor 91 and the frame image storage 92. Subsequent processing is the same as that according to the first embodiment.

The processing apparatus 10X may include the synchronization signal controller 76. In this case, as illustrated in FIG. 14, the image-capturing apparatus 5X includes the image-capturing element 72 and the first line buffer 73 alone. The synchronization signal controller 76 may be provided separately from the processing apparatus 10X and the image-capturing apparatus 5X. As illustrated in FIG. 14, in the second embodiment, the FPGA 79 included in the image-capturing apparatus 5 according to the first embodiment can be omitted. When the FPGA 79 is not provided, the first line buffer 73 is provided as an independent circuit.

The side-view mirror units 3A and 3B according to the second embodiment may also have the configuration illustrated in FIG. 14. The configuration of the second embodiment is the same as that of the first embodiment except for the items described with reference to FIG. 14.

As described above, the coupler 80 according to the second embodiment is provided between the image-capturing apparatus 5X and the processing apparatus 10X and transmits data of line images yet to be subjected to Bayer conversion, and the processing apparatus 10X performs pixel interpolation on the line images yet to be subjected to Bayer conversion. The display system of the second embodiment thus can further reduce the data transmitted between the apparatuses besides providing the advantageous effects of the first embodiment. Consequently, the display system of the second embodiment can further increase the transmission speed between the apparatuses, thereby reducing delay until the captured image is displayed and output.

Modifications

Figure 15:
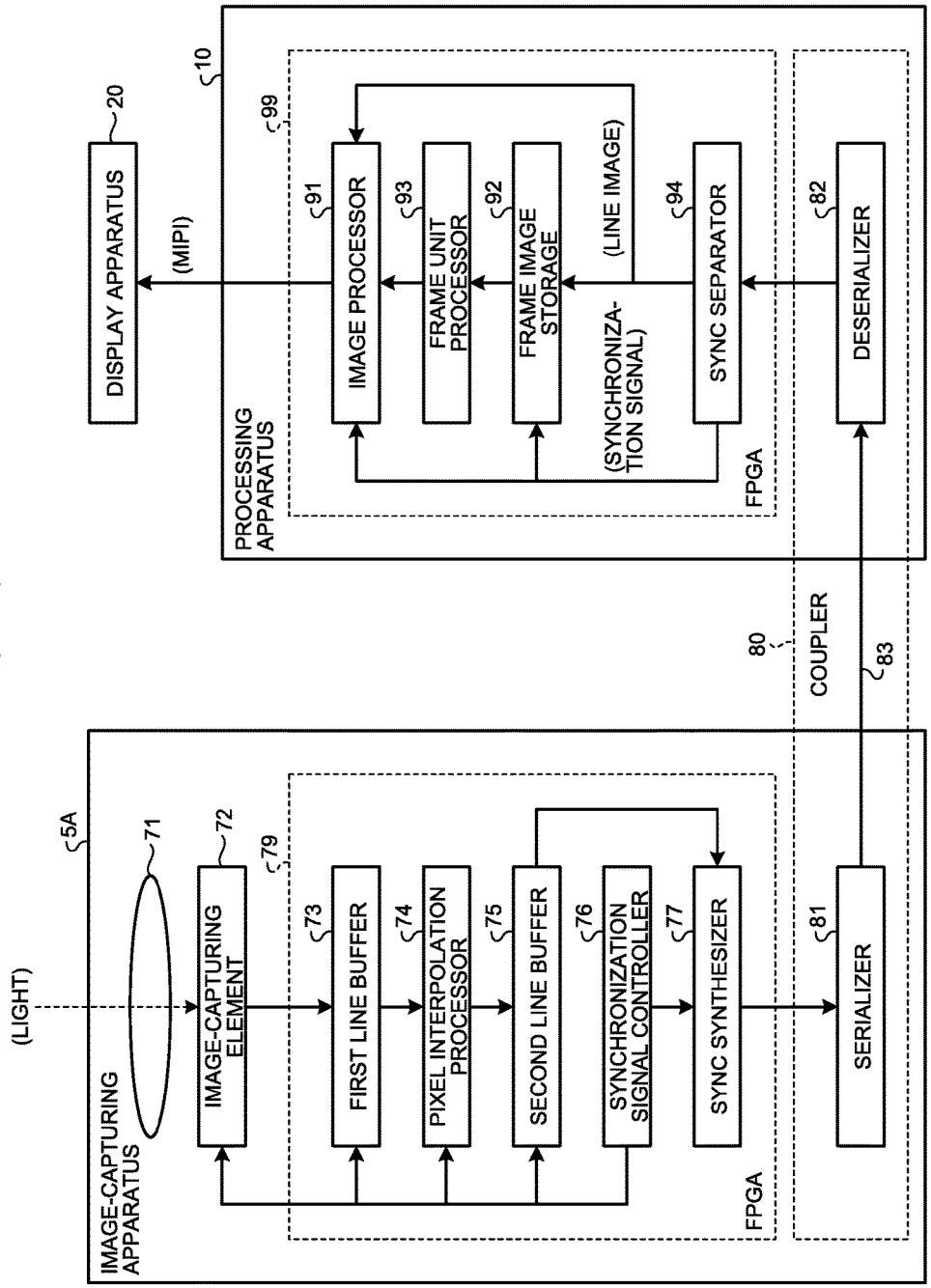
FIG. 15 is a diagram of a modification of the configuration of the rear-view mirror unit.
Figure 16:
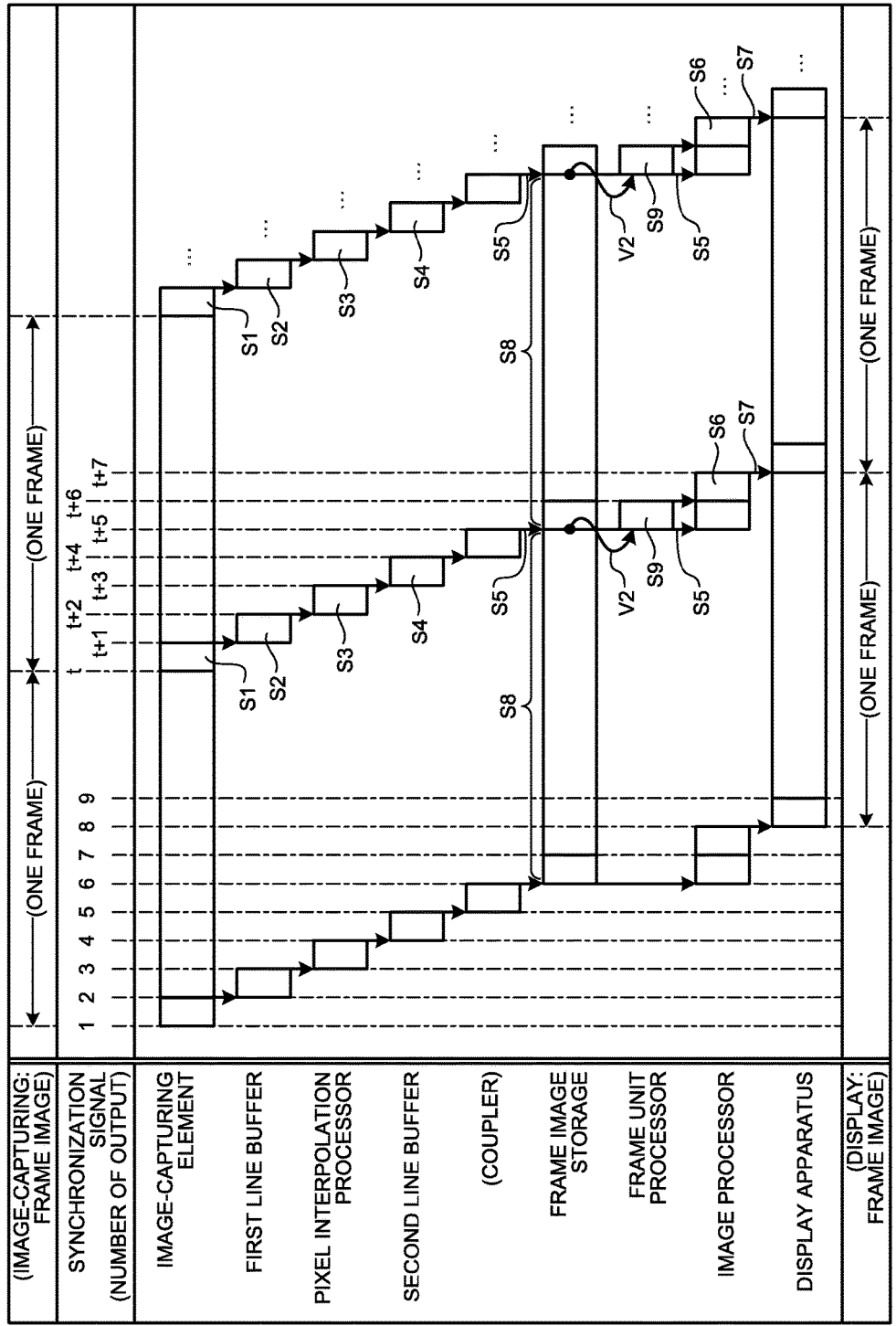
FIG. 16 is a timing chart corresponding to the modification illustrated in FIG. 15

The following describes modifications of the present invention with reference to FIGS. 15 and 16. Items described in the modifications are changes applicable to both of the first and the second embodiments. While FIG. 15 illustrates the rear-view mirror unit 2, the configuration is also applicable to the side-view mirror units 3A and 3B.

FIG. 15 is a diagram of a modification of the configuration of the rear-view mirror unit 2. FIG. 16 is a timing chart corresponding to the modification illustrated in FIG. 15. The frame image storage 92 may be configured to automatically output, at a timing when a frame image of one frame is stored therein, the stored frame image to the frame unit processor 93. In this case, as illustrated in FIG. 15, the frame unit processor 93 does not necessarily require the synchronization signals. As indicated by the arrow V2 in FIG. 16, the frame unit processor 93 generates correction data at a timing when the frame image storage 92 outputs a frame image. The frame unit processor 93 thus can operate synchronously with completion of the frame image of one frame.

The frame unit processor 93 may perform additional processing. The frame unit processor 93, for example, may perform processing relating to local dimming as frame unit processing. Specifically, a light-emitting area of the light source apparatus 50 is divided into a plurality of partial areas such that the intensity of light in each partial area can be adjusted by control of the light-source apparatus control circuit 60. In this case, the frame unit processor 93 determines, for each of the partial images corresponding to the partial areas, the brightness of illumination required for display of the frame image. The frame unit processor 93 outputs control signals for causing each partial area to emit light at the determined brightness to the light-source apparatus control circuit 60.

While the display apparatuses 20, 20A, and 20B and the display device 24 of the CID unit 4 (hereinafter, referred to as the display apparatus 20 and others) according to the embodiments above are liquid crystal display apparatuses, they may be OLED display devices as described above. Alternatively, the display apparatus 20 and others may be display apparatuses having another system as long as they can display data per line image.

In the embodiments above, correction based on the frame unit processing is not performed on line images that make up the frame image of the first frame. The first frame not subjected to correction based on the frame unit processing is not necessarily displayed. In this case, correction based on the frame unit processing can be performed on all the images displayed on the display apparatus 20 and others.

The frame unit processing may include other processing. The frame unit processor, for example, may perform detection to detect an object present within a predetermined distance from the image-capturing apparatus. By performing the detection, the on-board display system can detect the object in advance before the car collides with the object. In a case where the frame unit processor performs the detection, the display system 1 may further include a notifier that brings the user's attention to the detected object. The notifier calls the user's attention using at least one of light of a light-emitter, an image, audio, and the like. The display system 1 may cause the display apparatus to serve as the notifier. In this case, the image processor, for example, further performs image processing for superimposing and displaying a message that calls the user's attention on an image. The frame unit processor may detect an object that moves closer to the image-capturing apparatus using a plurality of frame images. The frame unit processor may extract information for grasping the states outside the car from the frame image. The frame unit processor may prepare in advance comparison data indicating tendencies of the frame image depending on various changes in weather conditions, such as sunny weather, cloudy weather, rain, snow, and fog. The frame unit processor may determine the weather when the frame image is captured based on the degree of agreement in comparison between the frame image and the comparison data. The frame unit processor can determine whether the car is running in a tunnel and whether it is daylight hours or nighttime, for example, using the same mechanism as that used for determination of the weather. The image processor may perform image processing (e.g., adjustment of brightness and adjustment of contrast) for making the image easier to see based on the determination results.

Part or all of the image processing described above is not necessarily performed. If all the frame unit processing is not performed, the frame image storage 92 and the frame unit processor 93 are not provided. If neither all the line unit processing nor all the frame unit processing is performed, the image processor 91 is not provided.

The processing apparatuses 10, 10A, and 10B (or the processing apparatus 10X, and the processing apparatuses 10, 10A, 10B, and 10X are hereinafter collectively referred to as the processing apparatus 10 and others) according to the embodiments above are arranged near the display apparatuses 20, 20A, and 20B. Alternatively, the processing apparatus 10 and others may be arranged near the image-capturing apparatus 5 (or the image-capturing apparatus 5X, and the image-capturing apparatuses 5 and 5X are hereinafter collectively referred to as the image-capturing apparatus 5 and others). In this case, the coupler 80 couples the processing apparatus 10 and others to the display apparatuses 20, 20A, and 20B and is used to transmit data between the processing apparatus 10 and others and the display apparatuses 20, 20A, and 20B. In other words, the display system includes the image-capturing apparatus 5 and others, the display apparatuses 20, 20A, and 20B, and the processing apparatus 10 and others. The image-capturing apparatus 5 and others each include the image-capturing element 72 that captures an image. The display apparatuses 20, 20A, and 20B display an image. The processing apparatus 10 and others perform image processing on an image. In the display system, the image-capturing apparatus 5 and others, the display apparatuses 20, 20A, and 20B, and the processing apparatus 10 and others are provided in a car, and the processing apparatus 10 and others are arranged near the image-capturing apparatus 5 and others or the display apparatuses 20, 20A, and 20B.

The processing apparatus 10 and others may be provided independently of both of the image-capturing apparatus 5 and others and the display apparatuses 20, 20A and 20B. In this case, the coupler 80 is used to transmit data between the image-capturing apparatus 5 and others and the processing apparatus 10 and others and between the processing apparatus 10 and others and the display apparatuses 20, 20A, and 20B.

The present invention naturally provides advantageous effects clearly defined by the description in the present specification or appropriately conceivable by those skilled in the art out of other advantageous effects provided by the aspects described in the embodiments or the like of the present invention including the modification.

What is claimed is:

1. A display system comprising:
   a display apparatus that displays an image resulting from image processing, the display apparatus including a plurality of pixels arranged in a matrix of a row direction and a column direction;
   an image-capturing apparatus including an image-capturing element that captures an image including a part of a frame image that corresponds a predetermined number of line images that is output by the pixels arranged in the predetermined number of rows; and
   an image processing apparatus that performs the image processing on the image, including:
   a storage device that stores the predetermined number of line images until the frame image is completed to store line images of a completed frame image; and
   an image processor that is configured to
   perform frame unit processing on a on the predetermined number of line images corresponding to the part of the frame image based on the line images of the completed frame image, and
   sequentially outputs the image per the predetermined number of line images by the pixels arranged in the predetermined number of rows to cause the display apparatus to display the frame image.

2. The display system according to claim 1,
   wherein the image processor is configured to perform, on the predetermined number of line images, the frame unit processing using a frame image one or more frames before a frame image made up of the line images.

3. The display system according to claim 2,
   wherein the image processor is configured to perform the image processing including line unit processing on the predetermined number of line images to be output to the display apparatus.

4. The display system according to claim 3,
   wherein the line unit processing includes one or more of gradation correction and color correction.

5. The display system according to claim 1,
   wherein the image processor is configured to perform the image processing including line unit processing on the predetermined number of line images to be output to the display apparatus.

6. The display system according to claim 5,
   wherein the line unit processing includes one or more of gradation correction and color correction.

7. The display system according to claim 1,
   wherein the frame unit processing includes one or more of distortion correction, auto exposure, and auto white balance of the image.

8. The display system according to claim 1, further comprising a coupler used to transmit data between the image-capturing apparatus and the image processing apparatus, between the image processing apparatus and the display apparatus, or both.

9. The display system according to claim 8,
   wherein the coupler is provided between the image-capturing apparatus and the image processing apparatus, and is configured to transmit data of the line images yet to be subjected to Bayer conversion, and
   wherein the image processing apparatus performs pixel interpolation on the line images yet to be subjected to Bayer conversion.

10. The display system according to claim 9,
    wherein the image-capturing apparatus and the display apparatus are configured to operate in association with a vehicle, and
    wherein the image-capturing apparatus is configured to capture an image outside the vehicle.

11. The display system according to claim 10,
    wherein the display system comprises a plurality of the image-capturing apparatuses, and
    wherein the image processor is configured to synthesize images captured by the image-capturing apparatuses.

12. The display system according to claim 10,
    wherein the display system comprises a plurality of the display apparatuses, and
    wherein, when at least one of the display apparatuses is not operable, at least one of the display apparatuses is operable and configured to display and output data as a substitute for the display apparatus that is not operable.

13. The display system according to claim 12,
    wherein the display system comprises a plurality of the image-capturing apparatuses, and
    wherein the image processor is configured to synthesize images captured by the image-capturing apparatuses.

14. The display system according to claim 8,
    wherein the image-capturing apparatus and the display apparatus are configured to operate in association with a vehicle, and
    wherein the image-capturing apparatus is configured to capture an image outside the vehicle.

15. The display system according to claim 8,
    wherein the coupler includes a least one of a serializer, a deserializer and a signal line.

16. The display system according to claim 1,
    wherein the image-capturing apparatus includes at least three image-capturing elements.

17. A display apparatus comprising:
    a storage device that stores a predetermined number of line images until a frame image is completed to store line images of a completed frame image; and
    an image processor that is configured to
    perform frame unit processing on the predetermined number of line images corresponding to a part of a frame image captured by an image-capturing element based on the line images of the completed frame image, and sequentially outputs an image per the predetermined number of line images by a plurality of pixels arranged in the predetermined number of rows to display the frame image.

18. A display system comprising:

a display apparatus that displays an image resulting from image processing, the display apparatus including a plurality of pixels arranged in a matrix of a row direction and a column direction;

an image-capturing apparatus including an image-capturing element that captures an image including a part of a frame image that corresponds a predetermined number of line images that is output by the pixels arranged in the predetermined number of rows; and an image processing apparatus that performs image processing on the image, wherein the image-capturing apparatus, the display apparatus, and the processing apparatus are configured to operate in association with a vehicle, wherein the image processing apparatus is arranged near one of the image-capturing apparatus and the display apparatus, wherein the image processing apparatus includes an image processor that performs is configured to perform frame unit processing on the predetermined number of line images corresponding to the part of the frame image based on the line images of the frame image, and sequentially outputs the image per the predetermined number of line images by the pixels arranged in the predetermined number of rows to cause the display apparatus to display the frame image.

19. A display system comprising:

a display means for displaying an image resulting from image processing;

an image-capturing means for capturing an image including a part of a frame image that corresponds a predetermined number of line images;

an image processing means for performing the image processing on the image, including a storage means for storing the predetermined number of line images until the frame image is completed to store line images of a completed frame image, and a frame unit means on the predetermined number of line images corresponding to the part of the frame image based on the line images of the completed frame image, and sequentially output the image per the predetermined number of line images by the pixels arranged in the predetermined number of rows to cause the display means to display the frame image.

* * * * *